(12) United States Patent
Miyamoto et al.

(10) Patent No.: US 11,207,660 B2
(45) Date of Patent: Dec. 28, 2021

(54) REACTION METHOD FOR REACTING REACTION OBJECT WITH LIQUID CONTAINING THE REACTION OBJECT BEING IN CONTACT WITH GRANULAR POROUS BODY

(71) Applicant: SnG Inc., Kyoto (JP)

(72) Inventors: Riichi Miyamoto, Kyoto (JP); Hongzhi Bai, Hyogo (JP)

(73) Assignee: SNG INC., Kyoto (JP)

( * ) Notice: Subject to any disclaimer, the term of this patent is extended or adjusted under 35 U.S.C. 154(b) by 1045 days.

(21) Appl. No.: 15/737,674

(22) PCT Filed: Jun. 29, 2016

(86) PCT No.: PCT/JP2016/069309
§ 371 (c)(1),
(2) Date: Dec. 18, 2017

(87) PCT Pub. No.: WO2017/002871
PCT Pub. Date: Jan. 5, 2017

(65) Prior Publication Data
US 2018/0185821 A1   Jul. 5, 2018

(30) Foreign Application Priority Data
Jun. 30, 2015   (JP) .............................. JP2015-132242

(51) Int. Cl.
| | |
|---|---|
| *B01J 20/28* | (2006.01) |
| *B01J 8/16* | (2006.01) |
| *B01J 45/00* | (2006.01) |
| *C01B 33/159* | (2006.01) |
| *G01N 30/88* | (2006.01) |
| *G01N 30/96* | (2006.01) |
| *B01J 8/02* | (2006.01) |
| *B01J 20/06* | (2006.01) |
| *B01J 20/10* | (2006.01) |
| *C01G 23/047* | (2006.01) |
| *B01D 15/38* | (2006.01) |

(52) U.S. Cl.
CPC ........... *B01J 20/28083* (2013.01); *B01J 8/02* (2013.01); *B01J 8/16* (2013.01); *B01J 20/06* (2013.01); *B01J 20/103* (2013.01); *B01J 20/28* (2013.01); *B01J 20/28092* (2013.01); *B01J 45/00* (2013.01); *C01B 33/159* (2013.01); *C01G 23/047* (2013.01); *G01N 30/88* (2013.01); *G01N 30/96* (2013.01); *B01D 15/3828* (2013.01)

(58) Field of Classification Search
CPC ........ B01J 20/28; B01J 20/28083; B01J 8/02; B01J 8/16; B01J 20/06; B01J 20/103; B01J 20/28092; B01J 45/00; C01B 33/159; C01G 23/047; G01N 30/88; G01N 30/96; B01D 15/3828
USPC ......................................................... 502/407
See application file for complete search history.

(56) References Cited

U.S. PATENT DOCUMENTS

| | | |
|---|---|---|
| 2005/0169829 A1 | 8/2005 | Dai et al. |
| 2006/0099402 A1 | 5/2006 | Bayram-Hahn et al. |
| 2007/0196928 A1 | 8/2007 | Nakanishi et al. |
| 2011/0172084 A1 | 7/2011 | Jang et al. |
| 2013/0241097 A1 | 9/2013 | Ippommatsu et al. |

FOREIGN PATENT DOCUMENTS

| | | |
|---|---|---|
| CN | 102170966 A | 8/2011 |
| JP | 2006-504515 A | 2/2006 |
| JP | 2006-192420 A | 7/2006 |
| JP | 2009-265047 A | 11/2009 |
| JP | 2013-3065 A | 1/2013 |
| JP | 2014-2008 A | 1/2014 |
| JP | 2016-70937 A | 5/2016 |
| WO | 2005094984 A1 | 10/2005 |
| WO | 2012070333 A1 | 5/2012 |
| WO | 2014083729 A1 | 6/2014 |

OTHER PUBLICATIONS

Regnier, Fred E. "Perfusion Chromatography", Nature, 350, pp. 634-635 (Apr. 18, 1991).
EP 16817979.4—Extended European Search Report dated Mar. 20, 2019, 166 pages.

*Primary Examiner* — Edward M Johnson
(74) *Attorney, Agent, or Firm* — Haynes Beffel & Wolfeld LLP

(57) ABSTRACT

A method for reacting a reaction object with a liquid containing the reaction object in contact with a granular porous body. The upper limit D (mm) of the particle diameter of the granular porous body is determined from $D = 0.556 \times LN(T) + 0.166$ in a column flow method in non-circulation type, and determined from $D = 0.0315 \times T + 0.470$ in the column flow method in a circulation type and a shaking method. The granular porous body includes a skeleton body including an inorganic compound having a three-dimensional continuous network structure, and has a two-step hierarchical porous structure including through-holes formed in voids in the skeleton body, and pores extending from a surface to an inside of the skeleton body and dispersed on the surface. A functional group having affinity with the metal ion is chemically modified on a surface of the granular porous body.

8 Claims, 17 Drawing Sheets

Fig. 5A  Copper (Through-hole: 1 μm, Pore-hole: 2nm, SV=32)
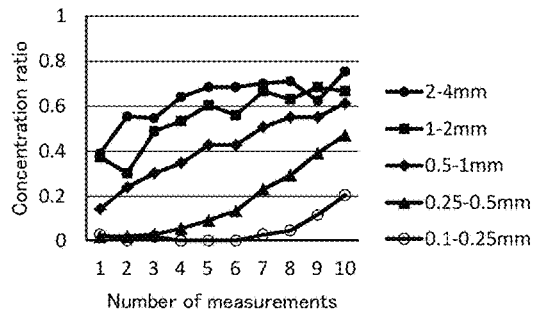
Fig. 5E  Copper (Through-hole: 1 μm, Pore-hole: 2nm, SV=1071)
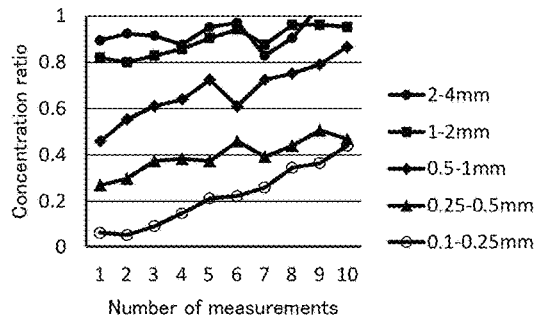
Fig. 5B  Copper (Through-hole: 1 μm, Pore-hole: 2nm, SV=64)
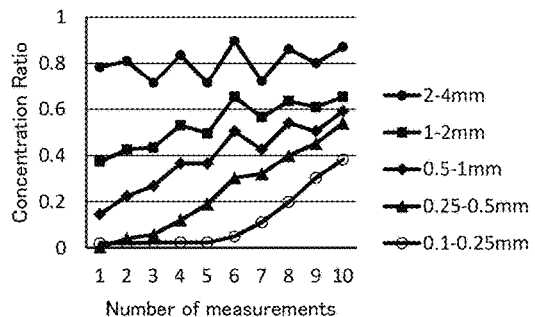
Fig. 5F  Copper (Through-hole: 1 μm, Pore-hole: 2nm, SV=2142)
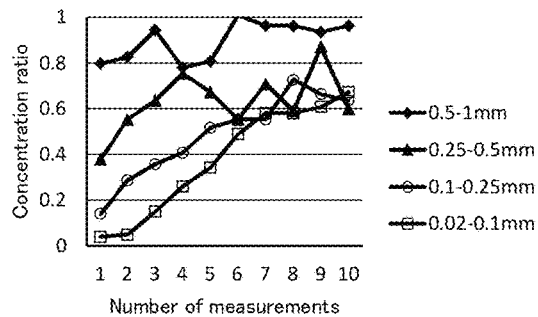
Fig. 5C  Copper (Through-hole: 1 μm, Pore-hole: 2nm, SV=160)
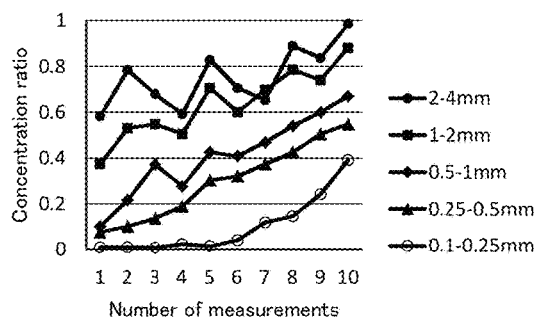
Fig. 5G  Copper (Through-hole: 1 μm, Pore-hole: 2nm, SV=3214)
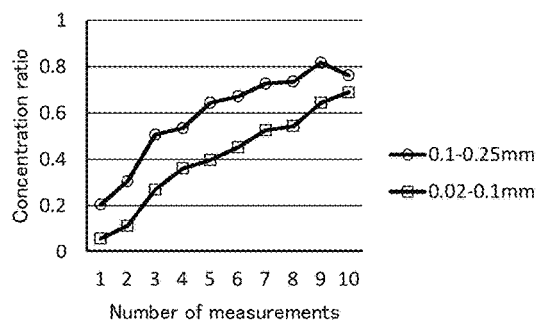
Fig. 5D  Copper (Through-hole: 1 μm, Pore-hole: 2nm, SV=321)
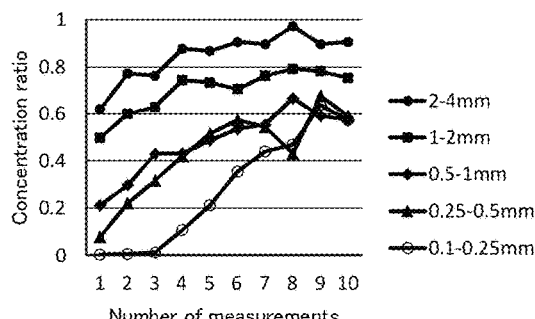

Fig. 6A  Palladium (Through-hole: 1 μm, Pore-hole: 2nm, SV=64)
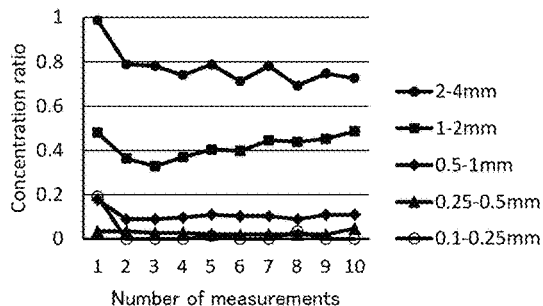
Fig. 6B  Palladium (Through-hole: 1 μm, Pore-hole: 2nm, SV=321)
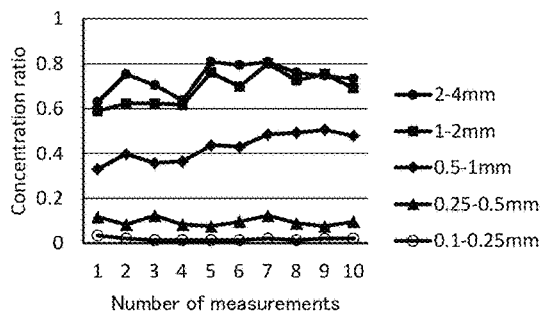
Fig. 6C  Palladium (Through-hole: 1 μm, Pore-hole: 2nm, SV=1071)
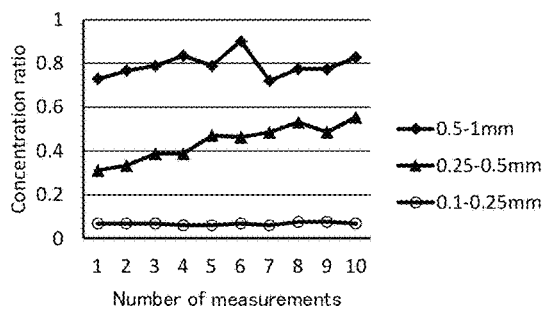
Fig. 6D  Palladium (Through-hole: 1 μm, Pore-hole: 2nm, SV=2142)
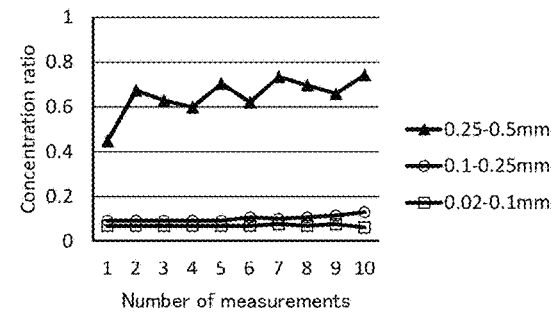
Fig. 6E  Palladium (Through-hole: 1 μm, Pore-hole: 2nm, SV=3214)
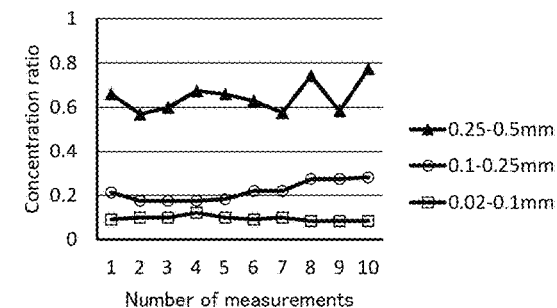

Fig. 7A  Blue pigment (Through-hole: 1 μm, Pore-hole: 20nm, SV=32)
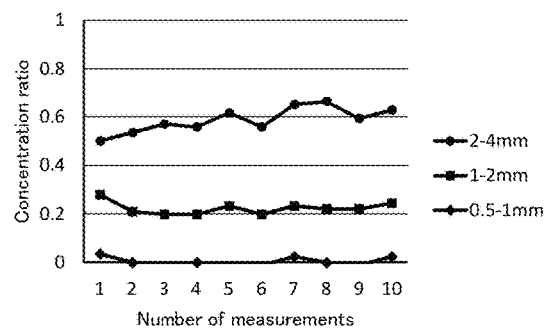
Fig. 7C  Blue pigment (Through-hole: 1 μm, Pore-hole: 20nm, SV=1071)
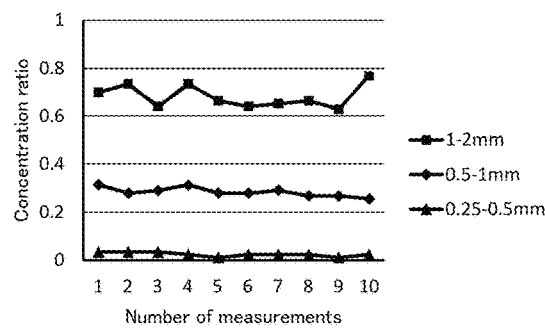
Fig. 7B  Blue pigment (Through-hole: 1 μm, Pore-hole: 20nm, SV=321)
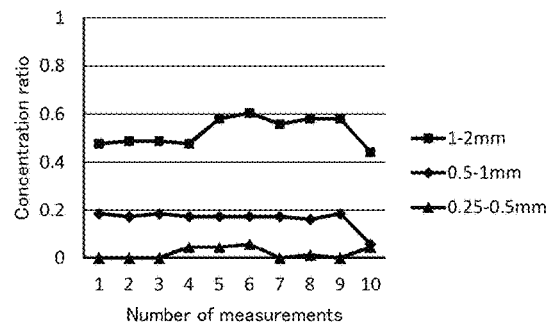
Fig. 7D  Blue pigment (Through-hole: 1 μm, Pore-hole: 20nm, SV=3214)
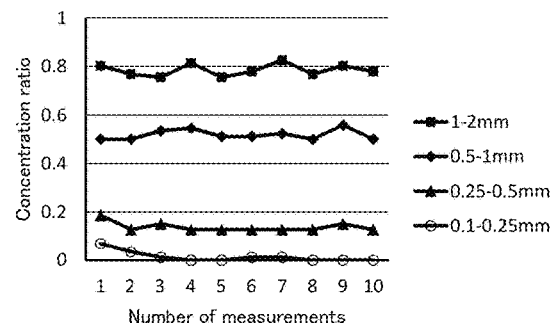

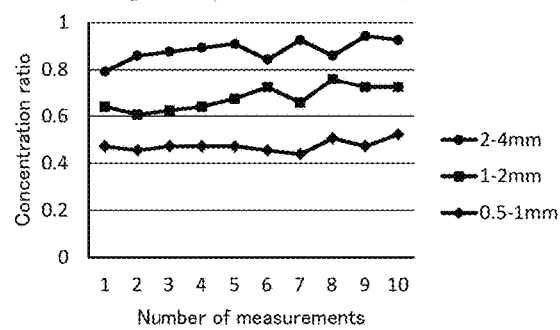
Fig. 8A Brown sugar mixture
(Through-hole: 1 μm, Pore-hole: 100nm, SV=32)
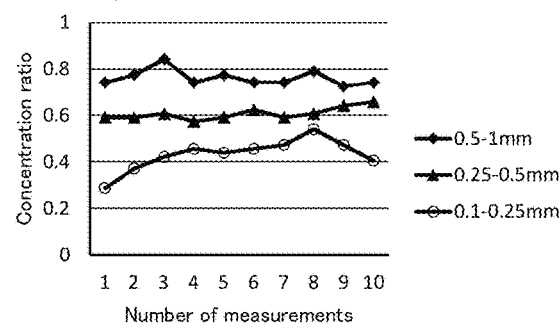
Fig. 8C Brown sugar mixture
(Through-hole: 1 μm, Pore-hole: 100nm, SV=1071)
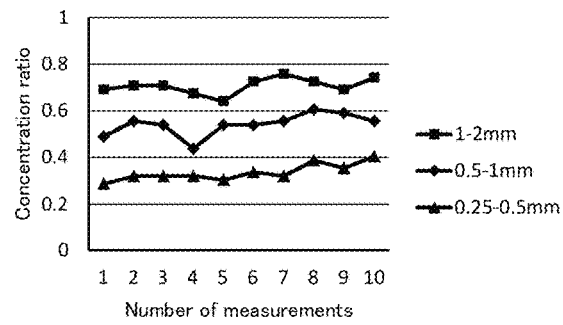
Fig. 8B Brown sugar mixture
(Through-hole: 1 μm, Pore-hole: 100nm, SV=321)
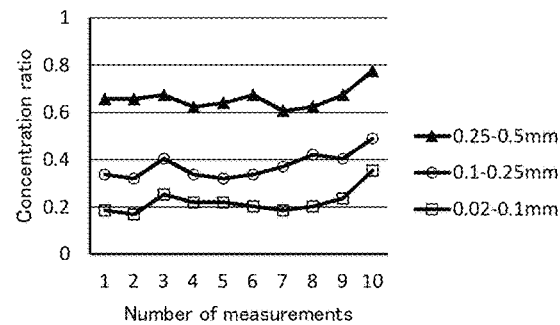
Fig. 8D Brown sugar mixture
(Through-hole: 1 μm, Pore-hole: 100nm, SV=3214)

Copper (Trough-hole: 0.1 μm, Pore-hole: 2nm, SV=32)

Copper (Through-hole: 50 μm, Pore-hole: 10nm, SV=32)

Copper (Through-hole: 1 μm, Pore-hole: 15nm, SV=32)

Shaking Palladium (Functional group: mercaptopropyl)

Fig. 13A  2 hours later

| Carrier | Through-hole | Pore-hole | Particle diameter | | | | | |
|---|---|---|---|---|---|---|---|---|
| | | | 4-8mm | 2-4mm | 1-2mm | 0.5-1mm | 0.25-0.5mm | 0.106-0.25mm |
| 2-step hierarchy | 0.1um | 2nm | 84% | 69% | 55% | 28% | 5% | 3% |
| 2-step hierarchy | 0.5um | 2nm | 82% | 72% | 61% | 22% | 2% | 0% |
| 2-step hierarchy | 1um | 2nm | 70% | 67% | 47% | 17% | 4% | 0% |
| 2-step hierarchy | 1um | 15nm | 87% | 74% | 59% | 46% | 26% | 35% |
| 1-step hierarchy | none | 2nm | no particle | no particle | 100% | 100% | 95% | 100% |
| 2-step hierarchy | 1um | 10nm | 72% | 61% | 65% | 30% | 17% | 9% |
| 2-step hierarchy | 1um | 20nm | 78% | 69% | 64% | 61% | 63% | 60% |
| 2-step hierarchy | 1um | 30nm | 81% | 73% | 67% | 77% | 84% | 79% |
| 2-step hierarchy | 1um | 40nm | 100% | 95% | 99% | 94% | 98% | 100% |
| 2-step hierarchy | 10um | 2nm | 96% | 95% | 73% | 60% | 30% | 9% |
| 2-step hierarchy | 50um | 2nm | 96% | 71% | 61% | 47% | 30% | 6% |

Fig. 13B  24 hours later

| Carrier | Through-hole | Pore-hole | Particle diameter | | | | | |
|---|---|---|---|---|---|---|---|---|
| | | | 4-8mm | 2-4mm | 1-2mm | 0.5-1mm | 0.25-0.5mm | 0.106-0.25mm |
| 2-step hierarchy | 0.1um | 2nm | 47% | 20% | 5% | 1% | 0% | 0% |
| 2-step hierarchy | 0.5um | 2nm | 31% | 20% | 9% | 17% | 0% | 0% |
| 2-step hierarchy | 1um | 2nm | 36% | 34% | 22% | 9% | 0% | 0% |
| 2-step hierarchy | 1um | 15nm | 64% | 43% | 11% | 31% | 28% | 43% |
| 1-step hierarchy | none | 2nm | no particle | no particle | 100% | 100% | 99% | 87% |
| 2-step hierarchy | 1um | 10nm | 33% | 9% | 8% | 2% | 9% | 2% |
| 2-step hierarchy | 1um | 20nm | 70% | 61% | 54% | 47% | 43% | 39% |
| 2-step hierarchy | 1um | 30nm | 88% | 90% | 88% | 73% | 56% | 55% |
| 2-step hierarchy | 1um | 40nm | 91% | 91% | 97% | 91% | 94% | 97% |
| 2-step hierarchy | 50um | 2nm | 82% | 32% | 23% | 17% | 30% | 1% |
| 2-step hierarchy | 10um | 2nm | 46% | 39% | 28% | 13% | 9% | 3% |

Shaking Palladium (Functional group: aminoethylaminopropyl)

| Elapsed time | Carrier | Through-hole | Pore-hole | Particle diameter | | | | | |
|---|---|---|---|---|---|---|---|---|---|
| | | | | 4-8mm | 2-4mm | 1-2mm | 0.5-1mm | 0.25-0.5mm | 0.106-0.25mm |
| 2 hours | 2-step hierarchy | 1um | 2nm | 85% | 57% | 35% | 15% | 1% | 0% |
| 24 hours | 2-step hierarchy | 1um | 2nm | 21% | 2% | 3% | 2% | 1% | 2% |

Fig. 14

Shaking Ruthenium (Functional group: aminoethylaminopropyl)

| Elapsed time | Carrier | Through -hole | Pore -hole | Particle diameter | | | | | |
|---|---|---|---|---|---|---|---|---|---|
| | | | | 4–8mm | 2–4mm | 1–2mm | 0.5–1mm | 0.25–0.5mm | 0.106–0.25mm |
| 2 hours | 2-step hierarchy | 1um | 2nm | 53% | 39% | 31% | 31% | 27% | 34% |
| 24 hours | 2-step hierarchy | 1um | 2nm | 39% | 8% | 0% | 0% | 1% | 0% |

Fig. 15

REACTION METHOD FOR REACTING REACTION OBJECT WITH LIQUID CONTAINING THE REACTION OBJECT BEING IN CONTACT WITH GRANULAR POROUS BODY

TECHNICAL FIELD

The present invention relates to a granular porous body which includes a skeleton body including an inorganic compound having a three-dimensional continuous network structure, and which has a two-step hierarchical porous structure including through-holes formed in voids in the skeleton body, and pores extending from a surface to the inside of the skeleton body and dispersively formed on the surface. Particularly, the present invention relates to a reaction method for reacting a reaction object with a liquid containing the reaction object such as a metal ion and a low-molecular-weight compound being in contact with the granular porous body.

BACKGROUND ART

A monolith porous body including an inorganic compound having a two-step hierarchical porous structure is a reactive porous body which includes a block-like skeleton body including an inorganic compound having a three-dimensional continuous network structure, and which is excellent in mass transfer from a hydrodynamic point of view owing to micrometer-order through-holes formed in voids in the skeleton body and having a characteristic three-dimensional continuous network structure and nanometer-order pores existing in the skeleton body. For example, as an example of separating and regenerating antibody molecules, there has been a case where the contact time is optimized and shortened to about 2 seconds (see Patent Document 1 below).

However, for fully reacting a fluid by causing the fluid to pass through a monolithic porous body of a block body, a dedicated jacket that covers the monolithic porous body without a gap is required. When a gap is generated between a monolithic porous body with through-holes having a size in a range of 0.1 to 100 μm and a jacket, a fluid is leaked through the gap, and therefore, it is necessary to control the gap in several-micron unit for causing the fluid to fully pass through the inside of the monolith porous body.

Thus, a porous body can be used with the porous body merely filled in a column provided beforehand when the porous body is a granular porous body having a two-step hierarchical porous structure in which through-holes and pores exist in particles obtained by crushing a monolithic porous body. As one example, it has been suggested that a column container is filled with a granular inorganic filler obtained by grinding the above-mentioned monolithic porous body, and applied as a pretreatment column for analysis (see Patent Document 2 below).

PRIOR ART DOCUMENTS

Patent Documents

Patent Document 1: Japanese Unexamined Patent Publication No. 2014-2008
Patent Document 2: Japanese Unexamined Patent Application Publication No. 2006-192420

Non-Patent Document

Non-Patent Document 1: Fred E. Regnier, "Perfusion Chromatography", Nature, 350, pp. 634-635 (18 Apr. 1991)

SUMMARY OF THE INVENTION

Problems to be Solved by the Invention

Unlike single-pore mesoporous particles in which only pores are present in particles, a granular porous body having a two-step hierarchical porous structure has through-holes serving as diffusion channels in particles. Thus, it is considered that a fluid is easily quickly diffused to the inside of the particle, and good reaction efficiency is obtained even when the particle diameter is larger as compared to a single-pore particle. However, individual specific studies on the physical properties of the granular porous body have not been sufficiently conducted, and an optimum particle diameter and clear reaction conditions such as a contact time in a method for reacting a reactant with a fluid containing the reactant being in contact with the granular porous body have not been found. There are many methods for reacting a monolithic porous body, but an optimum method for reacting an inorganic porous body having a two-step hierarchical porous structure is unclear, and has not been heretofore standardized.

As a diffusion behavior of molecules in a solution in particles, molecules are diffused very slowly through numerous nanometer-scale pores present in particles in the case of conventional one-step single-pore particles. In molecular diffusion, the diffusion rate varies depending on the strength of interaction with the pore surfaces of particles, but as compared to a micrometer region where dispersion and convection of molecules can be controlled, molecular diffusion is slower by a factor of 1000 or more.

For example, in the case of silica gel, there exist particles having a particle diameter of several microns to several millimeters as the above-mentioned single-pore particles. Particles which are commonly used in chromatography etc. in which the particles are used with a relatively short contact time of several seconds to several minutes have a particle diameter of about 5 to 200 μm. In addition, particles which are commonly used in adsorption of water or a low-molecular-weight compound, etc. in which the particles are used with a relatively long contact time of several hours to several days have a particle diameter of about 0.3 to 2 mm. As described above, it takes a considerable time for molecular diffusion to a deep part of the particle, and therefore it is necessary to reduce the particle diameter to a micrometer when a treatment with a short contact time of minutes or less is required.

On the other hand, it is known that in the case of a granular porous body having a two-step hierarchical porous structure in which micrometer-order through-holes are continuously exist in particles, a solution is efficiently dispersed and convected in the particles due to existence of micrometer-order through-holes, and therefore the solution is quickly diffused to a deep part of the particle (see, for example, Non-Patent Document 1). This phenomenon is called perfusion.

A reaction method with a fluid containing a reaction object being in contact with a granular porous body is inferior in reaction efficiency to a method with the fluid passing directly through a monolithic porous body. However, the monolithic porous body has a through-hole diameter of about 100 μm at most, and depending on the viscosity and flow volume of a fluid, the column pressure increases, so that the fluid is loaded, and therefore a high-speed treatment is possible, but there is a certain limit. On the other hand, in the case of a granular porous body, a fluid flows through a gap in the granular porous bodies, and therefore by increasing the particle diameter, the gap can be expanded to considerably reduce channel resistance.

However, as the particle diameter increases, the diffusion distance in the particle becomes longer, and therefore even if through-holes exist, consequently an enormous amount of time is required for the molecule to reach a deep part of the particle when the particle diameter increases to several millimeters. This is because even if the convection in the through-hole is fast, there is a difference between the convection speed in the particle and the convection speed at the particle surface in the case of an extremely large particle diameter for which the convection speed is higher by a factor of 10 or more when the fluid is quickly dispersed on the particle surface.

From the above, a relationship between a contact time and an optimum particle diameter, a through-hole diameter, a pore diameter and the like in a method for reacting a reactant with a fluid containing the reactant being in contact with a granular porous body having a two-step hierarchical porous structure has not been clarified yet.

The present invention has been made in in view of the problems of the granular porous body having a two-step hierarchical porous structure, and an object of the present invention is to provide efficient reaction conditions by clarifying a relationship between a contact time and an optimum particle diameter etc. in a method for reacting a reaction object with a liquid containing the reaction object being in contact with the granular porous body.

Means for Solving the Problem

The inventors of the present application have found that when the reaction method includes a circulation-type or non-circulation-type column flow method in which the liquid is caused to pass through a column filled with a granular porous body, so that the liquid is diffused in the granular porous body, or a shaking method in which a granular porous body is dispersively added in the liquid, and the liquid and the granular porous body are shaken to diffuse the liquid in the granular porous body, a particle diameter ensuring certain reaction efficiency is given by a natural logarithm of a contact time between the liquid and the granular porous body regardless of the molecular size of a reaction object in the non-circulation-type column flow method, and a particle diameter ensuring certain reaction efficiency is given by a linear function of the contact time regardless of the molecular size of the reaction object in the circulation-type column flow method and the shaking method, and the inventors have confirmed the effectiveness and viability of the findings on the basis of specific experiments.

That is, for achieving the above-mentioned object, a first aspect of the present invention provides a reaction method for reacting a reaction object with a liquid containing the reaction object being in contact with a granular porous body, wherein the reaction object is a metal ion, or a low-molecular-weight compound having a molecular weight of 2000 or less, the method includes a column flow method in which the liquid is caused to pass through a column filled with the granular porous body, so that the liquid is diffused in the granular porous body, or a shaking method in which the granular porous body is dispersively added in the liquid, and the liquid and the granular porous body are shaken to diffuse the liquid in the granular porous body, the granular porous body includes a skeleton body including an inorganic compound having a three-dimensional continuous network structure, and has a two-step hierarchical porous structure including through-holes formed in voids in the skeleton body, and pores extending from a surface to an inside of the skeleton body and dispersively formed on the surface, a most frequent pore diameter in a pore diameter distribution of the pores is within a range of 2 nm or more and 20 nm or less when the reaction object is a metal ion, and the most frequent pore diameter of the pores is within a range of 5 nm or more and 50 nm or less when the reaction object is the low-molecular-weight compound, a most frequent pore diameter in a pore diameter distribution of the through-holes is equal to or more than 5 times of the most frequent pore diameter of the pores, and within a range of 0.1 μm or more and 50 μm or less, a particle diameter of the granular porous body is equal to or more than 2 times of the most frequent pore diameter of the through-holes, and within a range of 20 μm or more and not more than an upper limit D (mm) defined depending on a contact time T (seconds) between the liquid and the granular porous body, the upper limit D is given by:

$$D=0.556 \times LN(T)+0.166$$

where the function LN is a natural logarithm in a case of the column flow method in a non-circulation type in which the liquid is caused to continuously pass through the column while a concentration of the reaction object in the liquid is kept constant; or $$D=0.0315 \times T+0.470$$

in a case of the column flow method in a circulation type, in which the liquid after the reaction is returned to the column, and continuously circulated, and the shaking method, and the contact time T (seconds) is given by:

a value obtained by dividing a volume ($m^3$) of the granular porous body by a flow rate ($m^3$/second) of the liquid in the case of the column flow method in a non-circulation type;

a value obtained by multiplying a fluid flow time (seconds) of the liquid by a volume ratio obtained by dividing the volume of the granular porous body by a volume of the liquid in the case of the column flow method in a circulation type; or a value obtained by multiplying the volume ratio by an elapsed time (seconds) after addition of the granular porous body in the liquid in the case of the shaking method.

The volume of the granular porous body is a volume as measured with the granular porous body densely filled into a predetermined container, and includes a volume of a solid part of the skeleton body, a volume of spaces occupied by through-holes and pores, and a volume of air gaps between particles.

Further, it is preferable that in the reaction method according to the first aspect, the reaction object is a metal ion, and a functional group having affinity with the metal ion is chemically modified on a surface of the granular porous body.

Further, it is preferable that in the reaction method of the first aspect, the metal ion is adsorbed to the surface of the granular porous body by undergoing a complexation reaction with the functional group.

Further, for achieving the above-mentioned object, a second aspect of the present invention provides a reaction method for reacting a reaction object with a liquid containing the reaction object being in contact with a granular porous body, wherein the reaction object is a compound having a molecular weight of 2000 or more and 1000000 or less, the method includes a non-circulation-type column flow method in which while a concentration of the reaction object in the liquid is kept constant, the liquid is caused to continuously pass through a column filled with the granular porous body, so that the liquid is diffused in the granular porous body, the granular porous body includes a skeleton body including an inorganic compound having a three-dimensional continuous network structure, and has a two-step hierarchical porous structure including through-holes formed in voids in the skeleton body, and pores extending from a surface to an inside of the skeleton body and dispersively formed on the surface, a most frequent pore diameter in a pore diameter distribution of the pores is within a range of 10 nm or more and 100 nm or less, a most frequent pore diameter in a pore diameter distribution of the through-holes is equal to or more than 5 times of the most frequent pore diameter of the pores, and within a range of 0.1 μm or more and 50 μm or less, a particle diameter of the granular porous body is equal to or more than 2 times of the most frequent pore diameter of the through-holes, and within a range of 20 μm or more and not more than an upper limit D (mm) defined depending on a contact time T (seconds) between the liquid and the granular porous body, the upper limit D is given by:

$$D=0.198\times LN(T)+0.270$$

where the function LN is a natural logarithm, and the contact time T is given by a value obtained by dividing a volume (m³) of the granular porous body by a flow rate (m³/second) of the liquid.

Further, it is preferable that in the reaction method according to the second aspect, a functional group having affinity with the reaction object is chemically modified on a surface of the granular porous body.

Further, it is preferable that in the reaction method according to the first or second aspect, the granular porous body is obtained by grinding and granulating a massive porous body prepared by a sol-gel method, the massive porous body includes a skeleton body including the inorganic compound having a three-dimensional continuous network structure, and has a two-step hierarchical porous structure including through-holes formed in voids in the skeleton body, and pores extending from a surface to an inside of the skeleton body and dispersively formed on the surface, a most frequent pore diameter in a pore diameter distribution of the pores of the massive porous body is within a range identical to the range of the most frequent pore diameter in the pore diameter distribution of the pores of the granular porous body, and a most frequent pore diameter in a pore diameter distribution of the through-holes of the massive porous body is within a range identical to the range of the most frequent pore diameter in the pore diameter distribution of the through-holes of the granular porous body.

Further, in the reaction method of the first or second aspect, the inorganic compound is preferably silica or titania.

Further, the present invention provides a granular porous body used for reaction with a metal ion, wherein the granular porous body includes a skeleton body including an inorganic compound having a three-dimensional continuous network structure, and has a two-step hierarchical porous structure including through-holes formed in voids in the skeleton body, and pores extending from a surface to an inside of the skeleton body and dispersively formed on the surface, a most frequent pore diameter in a pore diameter distribution of the pores is within a range of 2 nm or more and 20 nm or less, a most frequent pore diameter in a pore diameter distribution of the through-holes is equal to or more than 5 times of the most frequent pore diameter of the pores, and within a range of 0.1 μm or more and 50 μm or less, a particle diameter of the granular porous body is equal to or more than 2 times of the most frequent pore diameter of the through-holes, and within a range of 20 μm or more and 4 mm or less, and a functional group having affinity with the metal ion is chemically modified on a surface of the granular porous body.

Further, it is preferable that the granular porous body according to the aforementioned aspect has a function in which the functional group adsorbs the metal ion to the surface of the granular porous body by undergoing a complexation reaction with the metal ion.

Further, it is preferable that the granular porous body according to the aforementioned aspect is obtained by grinding and granulating a massive porous body prepared by a sol-gel method, the massive porous body includes a skeleton body including the inorganic compound having a three-dimensional continuous network structure, and has a two-step hierarchical porous structure including through-holes formed in voids in the skeleton body, and pores extending from a surface to an inside of the skeleton body and dispersively formed on the surface, a most frequent pore diameter in a pore diameter distribution of the pores of the massive porous body is within a range identical to the range of the most frequent pore diameter in the pore diameter distribution of the pores of the granular porous body, and a most frequent pore diameter in a pore diameter distribution of the through-holes of the massive porous body is within a range identical to the range of the most frequent pore diameter in the pore diameter distribution of the through-holes of the granular porous body.

Further, in the granular porous body according to the aforementioned aspect, the inorganic compound is preferably silica or titania.

Further, the present invention provides a column used for reaction with a metal ion, wherein a column container is filled with the granular porous body according to the aforementioned aspect.

Further, it is preferable that in the column according to the aforementioned aspect, a particle diameter of the granular porous body is not more than an upper limit D (mm) determined depending on a contact time T (seconds) between a liquid containing the metal ion and the granular porous body, the upper limit D is given by:

$$D=0.556\times LN(T)+0.166$$

where the function LN is a natural logarithm, and the contact time T is given by a value obtained by dividing a volume (m³) of the granular porous body by a flow rate (m³/second) of the liquid, in a case where passage of the liquid is non-circulation-type passage, and the upper limit D is given by:

$$D=0.0315 \times T+0.470,$$

the contact time T is given by a value obtained by multiplying a fluid flow time (seconds) of the liquid by a volume ratio obtained by dividing the volume of the granular porous body by a volume of the liquid, in a case where passage of the liquid is circulation-type passage.

Effects of the Invention

According to the reaction method of the aforementioned aspect, an optimum particle diameter range of the granular porous body is determined depending on which of a non-circulation-type column flow method, a circulation-type column flow method and a shaking method is used as a method for diffusing a reaction object-containing liquid in the granular porous body and bringing into contact with the liquid with the granular porous body (hereinafter, referred to as "contact method"), and a contact time between the liquid and the granular porous body in the contact method, and therefore use of a granular porous body which has a particle diameter within an unnecessarily small range, and which flies so easily that care is needed for handling can be avoided.

In addition, since a particle diameter range of the granular porous body is determined by the same relational expression for the metal ion and the low-molecular-weight compound, the particle diameter range of the granular porous body which is established for one kind of reaction object can be extended and applied to another kind of reaction object. In addition, for reactions with different contact times, the same relational expression can be used to set a particle diameter range, and thus labor for conducting many preliminary experiments can be saved.

Further, since substantially the same relational expression can be used for the circulation-type column flow method and the shaking method, the particle diameter range of the granular porous body which is established in one of the circulation-type column flow method and the shaking method can be extended and applied to the other.

BRIEF DESCRIPTION OF THE DRAWINGS

FIGS. 5(A) to 5(G) are views showing a change in concentration ratio of a post-reaction concentration and an initial concentration in Examples 1 to 7 for different solution flow rates where the reaction object is a copper ion.

FIGS. 6(A) to 6(E) are views showing a change in concentration ratio of a post-reaction concentration and an initial concentration in Examples 8 to 12 for different solution flow rates where the reaction object is a palladium ion.

FIGS. 7(A) to 7(D) are views showing a change in concentration ratio of a post-reaction concentration and an initial concentration in Examples 13 to 16 for different solution flow rates where the reaction object is a blue pigment.

FIGS. 8(A) to 8(D) are views showing a change in concentration ratio of a post-reaction concentration and an initial concentration in Examples 17 to 20 for different solution flow rates where the reaction object is a brown sugar.

FIGS. 13(A) and 13(B) are list tables showing particle diameter ranges, combinations of the through-hole diameter and the pore diameter, and results of measuring a misfetch ratio for each elapsed time in Example A.

FIG. 14 is a list table showing particle diameter ranges, and results of measuring a leakage ratio for each elapsed time in Example B with a different functional group.

FIG. 15 shows particle diameter ranges, and results of measuring a leakage ratio for each elapsed time in Example C with a different metal ion.

DESCRIPTION OF EMBODIMENTS

An embodiment of a reaction method according to the present invention (hereinafter, referred to as "this reaction method" as necessary), a granular porous body used in this reaction method (hereinafter, simply referred to as a "granular porous body"), and a column formed by filling a column container with the granular porous body and used in this reaction method (hereinafter, referred to as "this column" as necessary) will be described with reference to the drawings.

Figure 1:
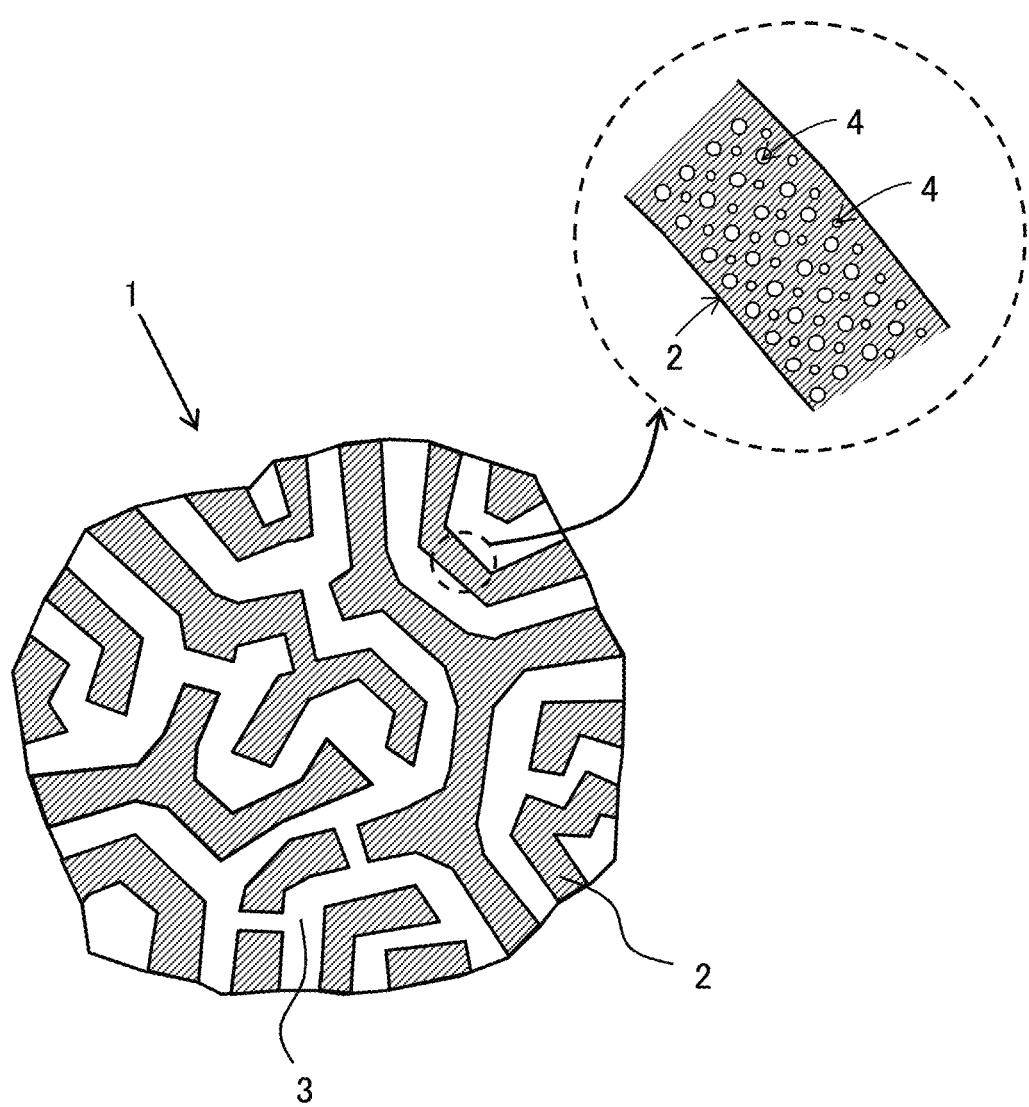
FIG. 1 is a sectional view schematically and two-dimensionally showing a structural feature of a granular porous body according to the present invention.

First, a structural feature of a granular porous body 1 to be used in this reaction method will be described. As schematically and two-dimensionally shown in FIG. 1, each particle of the granular porous body 1 includes a skeleton body 2 including an inorganic compound having a three-dimensional continuous network structure, and has a two-step hierarchical porous structure including through-holes 3 formed in voids in the skeleton body 2, and pores 4 extending from a surface to the inside of the skeleton body 2 and dispersively formed on the surface. In this specification, the "surface of the skeleton body" refers to a surface of the skeleton body exposed toward the through-hole, and does not include the inner wall surface of the pore formed in the skeleton body. In addition, the total surface of the skeleton body with the "surface of the skeleton body" added to the inner wall surface of the pore is referred to as a "surface of the granular porous body". The through-hole and the pore may also be referred to as a macropore and a mesopore, respectively.

In this embodiment, the inorganic compound that forms the skeleton body 2 is assumed to be silica gel or silica glass ($SiO_2$). In each particle of the granular porous body 1, the optimum range of the most frequent pore diameter $\phi 0m$ in the pore diameter distribution of pores 4 varies depending on a reaction object of this reaction method as described later, but generally falls within a range of 2 nm or more and 100 nm or less, the most frequent pore diameter $\phi 1m$ in the pore diameter distribution of through-holes 3 is equal to or more than 5 times of the most frequent pore diameter $\phi 0m$ of pores 4, and within a range of 0.1 μm or more and 50 μm or less, and the particle diameter Dp is equal to or more than 2 times of the most frequent pore diameter $\phi 1m$ of through-holes 3, and generally within a range of 20 μm or more and 4 mm or less. However, as described later, the upper limit D1 of the particle diameter Dp is further limited depending on the size of the reaction object, the method for bringing the granular porous body 1 into contact with a reaction object-containing liquid used in this reaction method, and the contact time.

Figure 2:
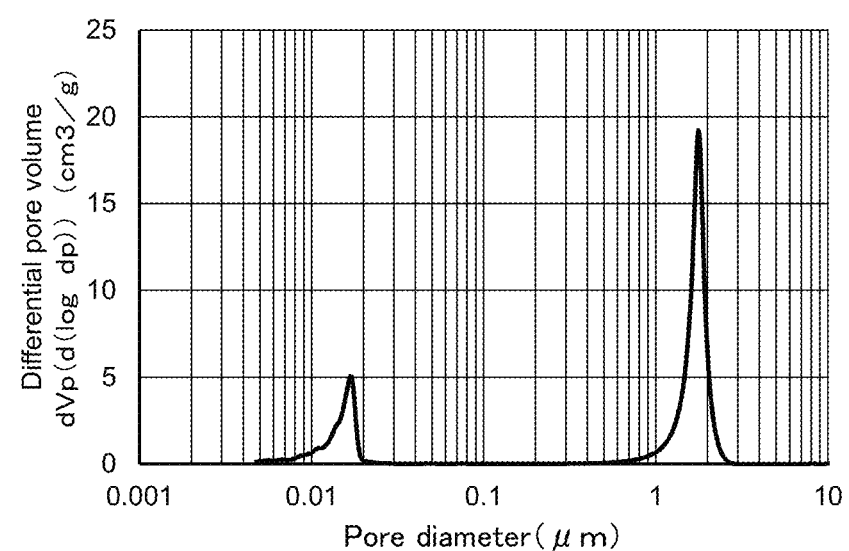
FIG. 2 is a view showing an example of a pore diameter distribution of through-holes and pores of the granular porous body according to the present invention.

Each of the most frequent pore diameters of through-holes 3 and pores 4 is a most frequent value (mode value) in a pore diameter distribution as measured by a well-known mercury press-in method. As the pore diameter distribution of pores 4, one derived by a well-known BJH method based on nitrogen adsorption measurement may be used. In addition, the most frequent pore diameter of through-holes 3 is not much different from an average pore diameter derived as an average of through-hole diameters measured at 20 to 30 arbitrary dispersed points in an electron micrograph of the skeleton body 2. FIG. 2 shows an example of pore diameter distributions of through-holes 3 and pores 4 as measured by a mercury press-in method. The abscissa represents the pore diameters (unit: μm) of through-holes 3 and pores 4, and the ordinate represents a differential pore volume (unit: $cm^3/g$). However, the differential pore volume also includes the differential through-hole volume. The peak on the left side shows the most frequent pore diameter of pores 4, and the peak on the right side shows the most frequent pore diameter of through-holes 3. In the example in FIG. 2, the most frequent pore diameters of through-holes 3 and pores 4 are about 1.77 μm and about 17 nm, respectively, the half-widths of through-holes 3 and pores 4 are about 0.34 μm and about 3.4 nm, respectively. The results of measuring the pore diameter distributions of through-holes 3 and pores 4 for the granular porous body 1 having a granular shape are substantially identical to the results of measuring the pore diameter distributions of through-holes 3 and pores 4 for a monolithic porous body (equivalent to a massive porous body) having the same two-step hierarchical porous structure before granulation as described later. Therefore, the pore diameter distributions of through-holes 3 and pores 4 may be measured in the state of a monolithic porous body.

Figure 3:
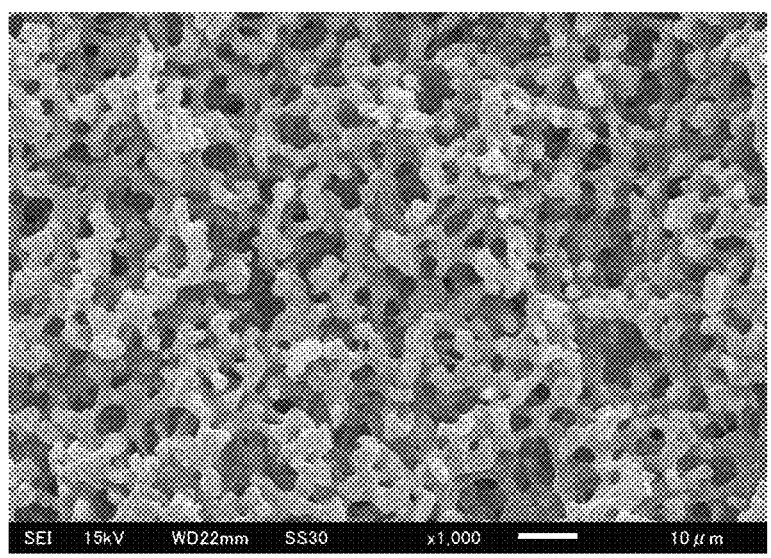
FIG. 3 is a SEM photograph showing an example of a three-dimensional continuous network structure of a silica monolith porous body.

In this embodiment, the granular porous body 1 is prepared in the following manner: a silica monolithic porous body which is synthesized by a spinodal decomposition sol-gel method as described in detail below and which includes silica gel or silica glass having a massive three-dimensional continuous network structure is ground to be granulated before or after sintering. FIG. 3 shows an example of a SEM (scanning electron microscope) photograph showing the three-dimensional continuous network structure of the silica monolithic porous body. Since particles having a large particle diameter and particles having a small particle diameter coexist in the granular porous body 1 just after grinding, the particles are sieved and classified to obtain the granular porous body 1 having a particle diameter in a desired range. Therefore, the upper limit and the lower limit of the particle diameter range are the values of the apertures of two kinds of sieves that are used in the classification treatment.

Next, a method for preparing the granular porous body 1 will be described. The method for preparing the granular porous body 1 is broadly divided into a step of synthesizing a monolithic porous body having a two-step hierarchical porous structure as a raw material of the granular porous body 1, and a subsequent granulation step.

First, the step of synthesizing a monolithic porous body including silica gel or silica glass having a three-dimensional continuous network structure by a spinodal decomposition sol-gel method will be described. The synthesis step is further divided into a sol preparation step, a gelation step and a removal step.

In the sol preparation step, a silica precursor as a raw material of silica gel or silica glass, and a coexisting substance serving to induce sol-gel transition and phase separation in parallel are added in an acid or alkaline aqueous solution, and at a low temperature of, for example, 5° C. or lower at which sol-gel transition hardly proceeds, the mixture is stirred to cause a hydrolysis reaction, so that a uniform precursor sol is prepared.

As a main component of the silica precursor, water glass (sodium silicate aqueous solution), or an inorganic or organic silane compound can be used. Examples of the inorganic silane compound include tetra-alkoxysilanes such as tetramethoxysilane, tetraethoxysilane, tetra-isopropoxysilane, tetra-n-butoxysilane and tetra-t-butoxysilane. Examples of the organic silane compound include trialkoxysilanes such as trimethoxysilane, triethoxysilane, triisopropoxysilane and trip henoxysilane, dialkoxysilanes such as methyldiethoxysilane, methyldimethoxysilane, ethyldiethoxysilane and ethyldimethoxysilane, monoalkoxysilanes such as dimethylethoxysilane and dimethylmethoxysilane, and the like, each of which has a substituent such as methyl, ethyl, propyl, butyl, hexyl, octyl, decyl, hexadecyl, octadecyl, dodecyl, phenyl, vinyl, hydroxyl, ether, epoxy, aldehyde, carboxyl, ester, thionyl, thio and amino. Alkoxysilicates containing a crosslinking reaction rate controlling group substituent such as a monoalkyl, a dialkyl and a phenyltriethoxy, oligomers such as a disilane being a dimer of the alkoxysilicate and a trisilane being a trimer of the alkoxysilicate, and the like are also considered as the silica precursors. Various compounds are commercially available as the hydrolyzable silane described above, and can be readily and inexpensively acquired, and it is easy to control a sol-gel reaction for forming a three-dimensional cross-linked body including a silicon-oxygen bond.

The acid or alkaline aqueous solution is an aqueous solution in which an acid or a base functioning as a catalyst for promoting a hydrolysis reaction of a silica precursor is dissolved in water as a solvent. Specific examples of the acid include acetic acid, hydrochloric acid, sulfuric acid, nitric acid, formic acid, oxalic acid and citric acid, and specific examples of the base include sodium hydroxide, potassium hydroxide, aqueous ammonia, sodium carbonate, sodium hydrogen carbonate, amines such as trimethyl ammonium, ammonium hydroxides such as tert-butyl ammonium hydroxide, and alkali metal alkoxides such as sodium methoxide. Specific examples of the coexisting substance include polyethylene oxide, polypropylene oxide, polyacrylic acid, block copolymers such as polyethylene oxide-polypropylene oxide block copolymers, cationic surfactants such as cetyltrimethylammonium chloride, anionic surfactants such as sodium dodecyl sulfate, and nonionic surfactants such as polyoxyethylene alkyl ethers. Water is used as a solvent, but an alcohol such as methanol or ethanol may be used.

In the gelation step, the precursor sol prepared in the sol preparation step is injected into a gelation container, and gelled at a temperature of, for example, about 40° C. at which sol-gel transition easily proceeds. Here, in the precursor sol, a coexisting substance serving to induce sol-gel transition and phase separation in parallel is added, and therefore spinodal decomposition is induced to gradually form a co-continuous structure of a silica hydrogel (wet gel) phase and a solvent phase which has a three-dimensional continuous network structure.

In the gelation step, a polycondensation reaction of the wet gel slowly progresses to cause shrinkage of the gel even after the silica hydrogel phase is formed, and therefore, as a step subsequent to the gelation step (post-gelation step), the co-continuous structure of the silica hydrogel phase and the solvent phase which is formed in the gelation step is immersed in a basic aqueous solution such as aqueous ammonia, and subjected to a heating treatment in a pressurized container to further promote the hydrolysis reaction, the polycondensation reaction and a dissolution and reprecipitation reaction of the silica hydrogel phase, so that the skeleton structure of the silica hydrogel phase can be further strengthened. The post-gelation step may be carried out as necessary. The heating treatment is not necessarily required to be performed in a pressurized container or a closed container, but since an ammonia component or the like may be generated or volatilized by heating, it is preferable to perform the heating treatment in a closed container or a container having pressure resistance.

As the dissolution and rep recipitation reaction of silica fine particles forming the skeleton body of the silica hydrogel phase proceeds, the diameter of pore formed in the skeleton body is increased. Further, when the dissolution and precipitation reaction is repeated in hydrothermal treatment, it is possible to perform control to further increase the pore diameter. The control of the pore diameter can also be performed by adding urea in the precursor sol besides a catalyst and a coexisting substance. Urea is hydrolyzed at a temperature of 60° C. or higher to produce ammonia, and the pore diameter of the pore formed in the skeleton body of the wet gel synthesized in the gelation step is increased by the ammonia. Thus, it is possible to control the pore diameter by adding urea. On the other hand, control of the structure and pore diameter of the through-hole is made possible by adjusting the amount of water or the silica precursor added to the precursor sol in the sol preparation step, or the composition and addition amount of the coexisting substance.

Subsequently, in the removal step, washing and drying, or only drying of the wet gel is performed to remove the solvent phase containing additives, unreacted substances and the like. The space after removal of the solvent phase forms a through-hole. By washing, a surface tension during drying which is caused by additives, unreacted substances and the like remaining in the solvent phase can be eliminated to suppress distortion and cracking in the gel during drying. A washing liquid is desirably a liquid such as an organic solvent or an aqueous solution. A liquid in which an organic compound or an inorganic compound is dissolved can also be used. Further, even if a solution having a pH different from the isoelectric point of the gel, such as an acid or an alkali, is used as the washing liquid, additives and the like remaining in the gel can be easily removed. Specifically, various kinds of acids such as hydrochloric acid, sulfuric acid, nitric acid, hydrofluoric acid, acetic acid, formic acid, carbonic acid, citric acid and phosphoric acid, and various kinds of bases such as sodium hydroxide, potassium hydroxide, ammonia, water-soluble amine, sodium carbonate and sodium hydrogen carbonate can be used. For drying the wet gel, natural drying may be adopted, and for eliminating distortion and cracks generated in drying of the wet gel, it is also preferable to adopt drying that is performed after replacement of a solvent in the wet gel by a solvent having a surface tension lower than that of water, such as isopropanol, acetone, hexane and hydrofluorocarbon; drying by freezing and sublimation; supercritical drying that is performed in a non-surface-tension state after exchange of a solvent in the wet gel with supercritical carbon dioxide; or the like.

Subsequently, the resulting dried gel can be sintered by firing to obtain silica glass. When the firing temperature is lower than the glass transition temperature (about 1000° C.) of silica, silica glass is not formed.

By passing through the above sol preparation step, gelation step and removal step, a monolithic porous body of dried silica gel or silica glass of three-dimensional continuous network structure which has a two-step hierarchical porous structure is obtained.

The granulation step is a step of crushing and granulating the massive monolithic porous body obtained by passing through the above-mentioned sol preparation step, gelation step and removal step. The grinding treatment in the granulation step may be performed manually, or using a mortar or the like, or a crushing apparatus such as a ball mill. When the dried gel obtained in the removing step is sintered, the granulation step may be performed either before or after the sintering.

The granulated monolithic porous body after the granulation step is classified by sieving with sieves having apertures of X μm and Y μm (D0≤X≤Y≤D1), respectively, so that the granulated monolithic porous body is recovered as the granular porous body 1 with the particle diameter Dp falling within a desired particle diameter range (D0 μm or more and D1 μm or less). However, the lower limit D0 (μm) of the desired particle diameter range is 20 (μm) or twice the most frequent pore diameter $\phi 1m$ (μm) of the through-hole, whichever is larger. Further, the upper limit D1 (mm) of the desired particle diameter range is calculated from the later-described relational expression according to a size of a reaction object, a contact method in this reaction method, and a contact time.

In this embodiment, the pore diameter, the through-hole diameter and the particle diameter can be each independently controlled as described above, and it is empirically known that when the most frequent pore diameter $\phi 1m$ in the pore diameter distribution of through-holes 3 is equal to or more than 5 times of the most frequent pore diameter $\phi 0m$ of pores 4, and the particle diameter Dp is equal to or more than 5 times of the most frequent pore diameter $\phi 1m$ of through-holes 3, the skeleton body 2 of each particle of the granular porous body 1 can retain a three-dimensional continuous network structure with a two-step hierarchical porous structure even after granulation. However, this embodiment also encompasses particles having a particle diameter Dp that is 2 to 5 times of the most frequent pore diameter $\phi 1m$ of the through-hole 3. This allows for the possibility that a small amount of crushed fragments that do not maintain a perfect three-dimensional continuous network structure as generated in the granulation step exist after classification by sieving. Even when such fragments exist, the main distribution range of the particle diameter Dp is consistent with the classification range of the sieve aperture: X µm or more and Y µm or less, and as described later, the influence of a granular porous body existing in a small amount and having a small particle diameter Dp can be ignored.

In addition, the through-hole diameter can be controlled within a range of 0.1 to 50 µm, i.e., a size that can be controlled in the base monolithic porous body as a parent body. The upper limit is larger by a factor of 500 than the lower limit in through-hole diameter, but when the through-hole diameter is larger by a factor of 100 or more than the molecular size of the liquid, the liquid can be perfused at a sufficient speed in the granular porous body. In addition, molecules in the solution can be efficiently perfused to the pore surface due to convection of solvent molecules.

The pore diameter can be freely controlled according to the molecular size of the reaction object. In the case of a silica gel of single-pore particles, the pore diameter can be controlled within a range of 2 to 100 nm. In the granular porous body, for example, when the reaction object substance is a metal ion, the appropriate pore diameter is about 2 to 20 nm because the ion radius is 1 nm or less. In addition, in the case of a molecule having a molecular weight of about several hundreds to 1000 and a molecular diameter of 1 to 5 nm, the pore diameter is desirably 5 to 50 nm. In addition, in the case of a molecule having a molecular weight of more than 1000 and a molecular diameter of 5 nm or more, the pore diameter is desirably 10 to 100 nm.

When the pore diameter is equal to the molecular diameter, the molecule can enter the inside of the pore, and therefore the pore diameter is desirably equal to or more than the molecular diameter. It is also possible to increase the curvature of the solid surface by making the pore diameter smaller than the molecular diameter and subject a part of the molecule to a chelate reaction. In addition, a pore having a size larger by a factor of 10 or more than the molecular diameter has a reduced specific surface area, and hence reduced reaction efficiency, but the pore diameter can be made larger by a factor of 10 or more than the molecular size for, for example, suppressing a nonspecific reaction. In an example regarding a monolithic porous body, Patent Document 1 above recommends that the pore diameter (center diameter) be 40 nm or more and 70 nm or less as a preferred range with respect to the size (about 10 to 12 nm) of an antibody to be adsorbed. The pore diameter is about 4 to 7 times of the size of the object to be adsorbed, and the ratio of the size of the antibody and the pore diameter is consistent with the ratio of the molecular diameter (1 to 5 nm) and the pore diameter (5 to 50 nm) although there is a slight difference between the molecular sizes, and is also consistent with the relation of the molecular diameter (5 nm or more) and the pore diameter (10 to 100 nm).

This reaction method will now be described. This reaction method is a reaction method for reacting a reaction object with a liquid containing the reaction object being in contact with a granular porous body. The reaction object is assumed to be a metal ion, a low-molecular-weight compound having a molecular weight of 2000 or less, or a compound having a molecular weight of 2000 or more and 1000000 or less. Particularly, the metal ion is assumed to be a transition metal ion that may be a noble metal ion. In addition, the reaction includes adsorption, ion exchange, complexation, catalytic reaction and the like, and this reaction method can be used for these reactions.

Examples of the reaction include a method for removing impurities in a liquid, and a method for extracting only a target component from a mixture in a liquid, and any of these methods makes use of interaction between the surface of an inorganic porous skeleton body of the granular porous body (including the surface of the inside of the pore) and the molecule of a reaction object. More specifically, it is possible to adsorb molecules by means of the acidity and charge of the surface of the skeleton body. It is also possible to introduce a functional group-containing organic compound to the surface of the skeleton body via physical interaction or a chemical bond, and use the granular porous body as a functional granular porous body having an ion-exchange function etc. It is also possible to treat the granular porous body under a reducing atmosphere with a hydrocarbon compound introduced to the surface of the skeleton body, and use the granular porous body as a carbide surface, or to sinter the granular porous body under a reducing atmosphere, and use the granular porous body as a composite having a Si—C bond. It is also possible to subject the granular porous body to a reduction treatment with a metal oxide introduced to the surface of the skeleton body, and use the granular porous body as a metal carrier.

For example, when a metal ion in a solution is reacted with and adsorbed to the granular porous body, the metal ion is adsorbed by undergoing a complexation reaction with a functional group introduced to the surface of the skeleton body, and therefore by introducing a functional group to the surface of the skeleton body, this reaction method can be used as a method for efficiently removing a metal ion. Examples of the organic functional group having affinity specifically with a metal ion include functional groups having mercaptopropyl, thiocyanuric acid, and thiourea as mercapto groups and thiol groups containing a sulfur element, and the organic functional group exhibits affinity with ions of Ag, Cd, Co, Cu, Fe, Hg, Ir, Ni, Os, Pb, Pd, Pt, Rh, Ru, Sc, Sn, Zn and the like. Examples of the functional group having a carboxylic acid group include ethylenediaminetriacetic acid, and the functional group exhibits affinity with ions of Ca, Cd, Co, Cr, Cs, Cu, Fe, Ir, La, lanthanoid-type elements, Li, Mg, Ni, Os, Pd, Rh, Ru, Sc, Sn, Zn and the like. Examples of the functional group having a nitrogen element include amine-based functional groups such as aminopropyl, aminoethylaminopropyl (diamine), aminoethylaminoethylaminopropyl (triamine) and imidazole, and the functional group can exhibit affinity with Cd, Co, Cr, Cu, Fe, Ni, Os, Pb, Pd, Pt, Rh, Ru, W, Zn and the like. In addition, mention is made of a phosphate group, a sulfate group, an ammonium group, a hydroxyl group, a keto group, and a composite of these substituents.

Examples of the method for introducing a functional group include a method for chemically fixing a functional group to the surface of the skeleton body via a covalent bond, and a method for physically fixing a functional group via physical interaction such as ionic bonding or hydrophobic interaction. Examples of the method for chemically introducing a functional group include a method in which a silane coupling agent having a functional group is reacted to fix the functional group via a hydroxyl group on the surface of the skeleton body ($SiO_2$).

Examples of the organosilane compound that can be used as a silane coupling agent include trialkoxysilanes such as trimethoxysilane, triethoxysilane, triisopropoxysilane and trip henoxysilane, dialkoxysilanes such as methyldiethoxysilane, methyldimethoxysilane, ethyldiethoxysilane and ethyldimethoxysilane, monoalkoxysilanes such as dimethylethoxysilane and dimethylmethoxysilane, alkylchlorosilanes such as octadecyltrichlorosilane, octadecylmethyldichlorosilane, octadecyldimethylchlorosilane, octadecylsilazane, octadecyltrimethoxysilane, octadecylmethyldimethoxysilane, octyl, trimethylchlorosilane (TMS), dimethyl-n-octylchlorosilane and dimethyl-n-octadecylchlorosilane (ODS), each of which has a substituent such as methyl, ethyl, propyl, butyl, hexyl, octyl, decyl, hexadecyl, octadecyl, dodecyl, phenyl, vinyl, hydroxyl, ether, epoxy, aldehyde, carboxyl, ester, thionyl, thio or amino. Alkoxysilicates containing a crosslinking reaction rate controlling group substituent such as a monoalkyl, a dialkyl and a phenyltriethoxy, oligomers such as a disilane being a dimer of the alkoxysilicate and a trisilane being a trimer of the alkoxysilicate, and the like can also be used as silane coupling agents.

When the reaction object is a blue pigment, examples thereof include low-molecular-weight compounds which are represented by a blue pigment and have a molecular weight of 300 to 1000, such as Basic Blue 17 (toluidine blue) having a molecular weight of 305.82, Brilliant Blue FCF having a molecular weight of 792.86, Indigo Carmine having a molecular weight of 466.36, and Coomassie Brilliant Blue having a molecular weight of 833.048. These blue pigments are adsorbed by chemical interaction with the surface of the skeleton body ($SiO_2$). Here, direct chemical interaction with the surface of the skeleton body occurs, and introduction of a functional group is unnecessary.

When the reaction object is a macromolecular compound contained in a brown sugar, examples of the macromolecular compound include flavonoids having a molecular weight of 1000 or less, melanins having a molecular weight of 150000 or more, chlorophyll, carotene, xanthophyll or the like having a molecular weight of 1000 or less, melanoidins having a molecular weight of 50000 or less, caramel having a molecular weight of 25000 or less, and 6-carbon sugar decomposition products having a molecular weight of about 1000 to 5000, and these compounds have a molecular weight in a wide range of about 1000 to about 1000000. In particular, the brown sugar is rich in caramel (molecular weight of about 2000 to 25000) and melanoidins (molecular weight of about 3000 to 50000). The macromolecular compound contained in the brown sugar is adsorbed through an ion-exchange reaction with a functional group introduced to the surface of the skeleton body. Examples of the functional group include a trimethylpropylammonium chloride group as a quaternary ammonium group. Other functional groups for ion exchange reaction mainly include a secondary or tertiary amine group, a sulfonate group, a carboxylate group, and a phosphate group.

As described above, in this reaction method, a functional group is introduced to the surface of the skeleton body according to the kind of reaction object and reaction, and the functional group may be introduced to a monolithic porous body as a parent of the granular porous body, followed by passing through the granulation step to prepare a granular porous body to which the functional group is introduced. Alternatively, a monolithic porous body before introduction of the functional group may be granulated to prepare a granular porous body, followed by introducing the functional group.

Further, in this reaction method, any of a non-circulation-type column flow method, a circulation-type column flow method, and a shaking method is used as a method (contact method) in which a liquid containing a reaction object is diffused into a granular porous body, and brought into contact with the granular porous body. In the non-circulation-type column flow method in this reaction method, the liquid is caused to continuously pass into a column while the concentration of the reaction object in the liquid is kept constant. In the circulation-type column flow method in this reaction method, the post-reaction liquid released from an outlet of the column is returned to an inlet of the column, and circulated. In the non-circulation-type and circulation-type column flow methods in this reaction method, the liquid containing the reaction object continuously passes through the column. In this respect, this reaction method is different from liquid chromatography in which a liquid containing a mixture to be separated is caused to pass through a column, and temporarily adsorbed, and an eluent is continuously fed to separate the mixture.

Next, performance in one example (Example 1) of this reaction method using the above-described granular porous body is compared with performance in a comparative example using commercially available single-pore particle silica gel. In this performance comparison, a metal ion (copper ion) was reacted by a non-circulation-type column flow method, and a copper acetate aqueous solution (concentration: 4 mg/mL) was used as a liquid containing a copper ion. The solution was caused to pass at a flow rate of 0.3 mL/minute through a main column filled with a granular porous body of Example 1 and a comparative example column filled with a silica gel of a comparative example, 0.3 mL of the solution was recovered every one minute from each of outlets of the columns, a concentration ratio of the concentration of the solution collected at the column outlet (post-reaction concentration) and the initial concentration before passing (post-reaction concentration/initial concentration) was determined, and changes in concentration ratio were compared.

The main column and the comparative example column are filled with the granular porous body of Example 1 and the silica gel of the comparative example, respectively, in column containers each having an inner diameter of 6 mm and a length of 20 mm, and both the columns have the same column volume (equivalent to the volume of the granular porous body) of about 0.56 mL. The space velocity SV (1/hour) is about 32.14. Mercaptopropyl is introduced as a functional group to each of the granular porous body of Example 1 and the silica gel of the comparative example. The through-hole diameter and the pore diameter of the granular porous body of Example 1 are 0.1 μm and 2 nm, respectively, and the pore diameter of the silica gel of the comparative example is 2 nm. Five kinds of particle diameter ranges: 0.1 to 0.25 mm, 0.25 to 0.5 mm, 0.5 to 1 mm, 1 to 2 mm and 2 to 4 mm were set as the particle diameter range of the granular porous body of Example 1, and four kinds of particle diameter ranges: 0.1 to 0.25 mm, 0.25 to 0.5 mm, 0.5 to 1 mm and 1 to 2 mm were set as the particle diameter range of the silica gel of the comparative example.

Figure 4A:
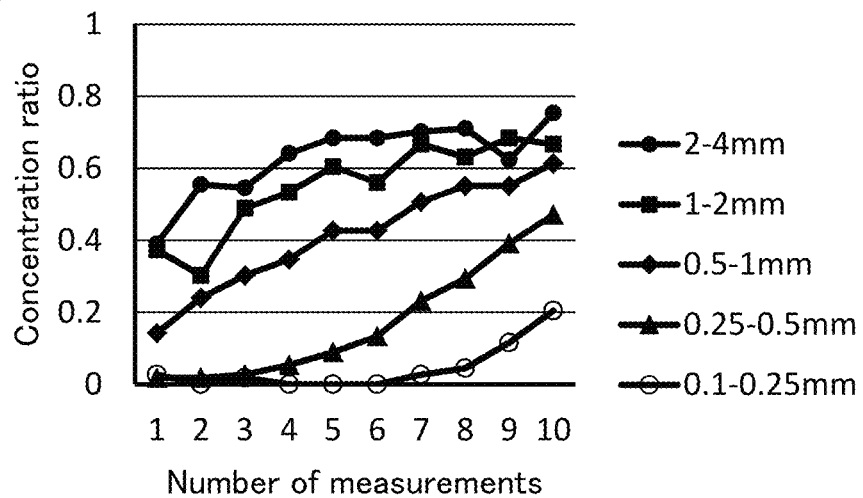
FIGS. 4(A) and 4(B) are views showing a change in concentration ratio of a post-reaction concentration and an initial concentration in Example 1 and a comparative example.
Figure 4B:
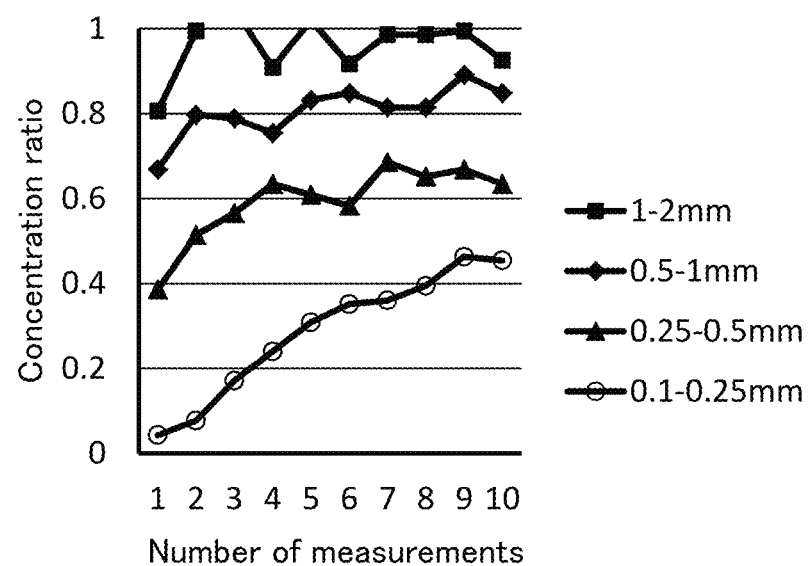

FIGS. 4(A) and 4(B) show a change in concentration ratio of the post-reaction concentration and the initial concentration in Example 1 and the comparative example, respectively. In both FIGS. 4(A) and 4(B), the ordinate represents the concentration ratio, and the abscissa represents the number of measurements per minute. As is evident from FIGS. 4(A) and 4(B), comparison between Example 1 and the comparative example in the same particle diameter range shows that the concentration ratio is lower and the leakage is smaller in Example 1 than in the comparative example. Performance in the particle diameter range of 0.5 to 1 mm in Example 1 and performance in the particle diameter range of 0.1 to 0.25 mm in the comparative example are almost the same, and it is thus apparent that in Example 1, the particle diameter range can be increased by a factor of about 5 times for the same space velocity SV.

This reaction method is characterized in that the particle diameter range can be made larger as compared with the case where a silica gel of single-pore particles is used as described above, and further, this method is characterized in that the upper limit D1 (mm) of the particle diameter range can be easily calculated from the later-described relational expression according to the size of a reaction object, the contact method in this reaction method, and the contact time.

[Non-Circulation-Type Column Flow Method]

Next, the upper limit D1 (mm) when the contact method is a non-circulation-type column flow method is given by a relational expression with the contact time T (seconds) as a variable as shown in Mathematical Formula 1 below. The function LN is a natural logarithm, Ai is a coefficient in the reaction object i, and Bi is a constant in the reaction object i. The contact time T (seconds) is a value obtained by converting the reciprocal of the space velocity SV in terms of seconds, and is given by a value obtained by dividing the volume of the granular porous body, i.e., the volume of the column volume by the flow rate of the liquid (solution) containing the reaction object i.

$$D1 = Ai \times LN(T) + Bi \quad \text{(Mathematical Formula 1)}$$

In the following, coefficient Ai and constant Bi in Mathematical Formula 1 above for each reaction object i are derived using a copper ion, a palladium ion, a blue pigment and a brown sugar as the reaction object i. The deriving procedure will now be described.

In the same manner as in Example 1 in FIG. 4(A), the concentration ratio of the post-reaction concentration and the initial concentration is measured for a plurality of different space velocities SV for each reaction object i. The column volume and the amount of the solution sequentially collected from each column outlet are about 0.56 mL and 0.3 mL, respectively, and are the same as in Example 1. The through-hole diameter and the pore diameter of the granular porous body are 0.1 μm and 3 nm, respectively, and are the same as in Example 1. For the particle diameter range, measurable one is appropriately selected from the five kinds of particle diameter ranges adopted in Example 1. The space velocity SV is adjusted by the flow rate of the solution. Therefore, the time interval at which 0.3 mL of the solution is collected at the column outlet varies depending on the space velocity SV, but the number of measurements is invariably 1 to 10, and the total amount of the solution to be measured is invariably 3 mL. However, for the copper ion, there are two kinds of numbers of measurements: 10 (1 to 10) and 5 (1 to 5) (the total amount of the solution is 1.5 mL) for the later-described reason.

FIGS. 5(A) to 5(G) show the results of measuring a change in concentration ratio of a post-reaction concentration and an initial concentration for seven kinds of flow rates of the solution: 0.3 mL/minute (SV=32), 0.6 mL/minute (SV=64), 1.5 mL/minute (SV=160), 3 mL/minute (SV=321), 10 mL/minute (SV=1071), 20 mL/minute (SV=2142) and 30 mL/minute (SV=3214) (Examples 1 to 7) where the reaction object i is a copper ion. The result in FIG. 5(A) is the same as in Example 1 in FIG. 4(A). The functional group introduced into the granular porous body, the solution containing a copper ion, and the initial concentration of the solution in Examples 2 to 7 are the same as in Example 1.

FIGS. 6(A) to 6(E) show the results of measuring a change in concentration ratio of a post-reaction concentration and an initial concentration for five kinds of flow rates of the solution: 0.6 mL/minute (SV=64), 3 mL/minute (SV=321), 10 mL/minute (SV=1071), 20 mL/minute (SV=2142) and 30 mL/minute (SV=3214) (Examples 8 to 12) where the reaction object i is a palladium ion. The functional group introduced into the granular porous body in each of Examples 8 to 12 is the same as in Example 1. The solution containing a palladium ion is a dinitrodiaminepalladium (II) solution, and has an initial concentration of 165 μg/mL.

FIGS. 7(A) to 7(D) show the results of measuring a change in concentration ratio of a post-reaction concentration and an initial concentration for four kinds of flow rates of the solution: 0.3 mL/minute (SV=32), 3 mL/minute (SV=321), 10 mL/minute (SV=1071) and 30 mL/minute (SV=3214) (Examples 13 to 16) where the reaction object i is a blue pigment. A functional group is not introduced into the granular porous body in each of Examples 13 to 16. The solution containing a blue pigment is a Basic Blue 17 aqueous solution, and has an initial concentration of 1 ppm.

FIGS. 8(A) to 8(D) show the results of measuring a change in concentration ratio of a post-reaction concentration and an initial concentration for four kinds of flow rates of the solution: 0.3 mL/minute (SV=32), 3 mL/minute (SV=321), 10 mL/minute (SV=1071) and 30 mL/minute (SV=3214) (Examples 17 to 20) where the reaction object i is a brown sugar. The solution containing a brown sugar is an aqueous solution of a Hateruma-produced brown sugar (a mixture including a brown substance having a molecular weight of about 2000 to 1000000), and has an initial concentration of 10 mg/mL. The functional group introduced into the granular porous body in each of Examples 17 to 20 is a trimethylpropylammonium chloride group.

The contact times for the space velocities SV (SV=32, 64, 160, 321, 1072, 2142 and 3214, each of which is an approximate value) adopted in the above experiments are 112.5 seconds, 56.25 seconds, 22.5 seconds, 11.215 seconds, 3.361 seconds, 1.681 seconds and 1.12 seconds, respectively.

FIGS. 5 to 8 show that irrespective of the reaction object i, the larger the particle diameter range of the granular porous body, the higher the concentration ratio, leading to an increase in ratio of a so called "leakage" in which the reaction object i in the solution passes through a column in an unreacted state. Therefore, the average of the concentration ratios in a plurality of measurements indicates the leakage ratio of the whole solution passing through the column. FIGS. 5 to 8 show that irrespective of the reaction object i, there is a tendency that the larger the space velocity SV, i.e., the shorter the contact time T, the higher the concentration ratio, leading to an increase in leakage ratio, even in the same particle diameter range.

In addition, as is evident in the case of the copper ion, a reaction site on the surface of the granular porous body (for example, a functional group introduced in the case of a metal ion) is saturated to start a breakthrough as the number of measurements increases, and there is a tendency that the larger the particle diameter range of the granular porous body, or the shorter the contact time, the earlier the start of the breakthrough.

It is considered that in this reaction method, the leakage ratio should be reduced to 50% or less for efficiently maintaining the reaction, and thus a relation between the upper limit D1 of the particle diameter Dp and the contact time T which is required for maintaining the leakage ratio of 50% or less is derived for each reaction object i. Specifically, for each particle diameter range of each SV, the leakage ratio is calculated from the results of measuring the concentration ratio as shown in FIGS. 5 to 8, on the basis of an average of concentration ratios in ten measurements (1 to 10), for eliminating the influence of measurement errors. In the case of a copper ion, the leakage ratio based on an average of concentration ratios in five measurements (1 to 5) was calculated in addition to an average of concentration ratios in ten measurements (1 to 10) for allowing for the influence of the breakthrough.

From each SV for each reaction object i as calculated in the manner described above, and the leakage ratio in each particle diameter range, a particle diameter at which the leakage ratio at each SV (contact time T) for each reaction object i is 50% is calculated. Specifically, a median of the particle diameter range for the leakage ratio around a leakage ratio of 50% is linearly interpolated to determine a median particle diameter corresponding to a leakage ratio of 50%, and the median particle diameter is multiplied by a ratio (1.33 in this embodiment) of the upper limit and the median of the particle diameter range to calculate the upper limit D1 ($mm$) of the particle diameter. From the upper limit D1 ($mm$) calculated in the manner described above, and the corresponding contact time T (seconds), the coefficient Ai and the constant Bi in the relational expression in Mathematical Formula 1 above are approximately calculated by a least squares error method.

Figure 9A:
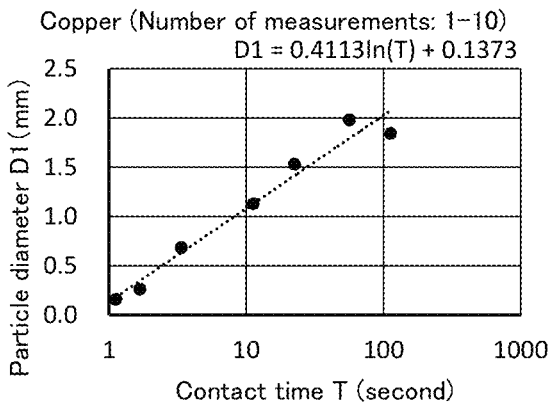
FIGS. 9(A) to 9(E) are views each showing an upper limit D1 in a non-circulation-type column flow method, which is derived for each reaction object, a corresponding contact time T, and a relational expression thereof in a semi-logarithmic graph.
Figure 9B:
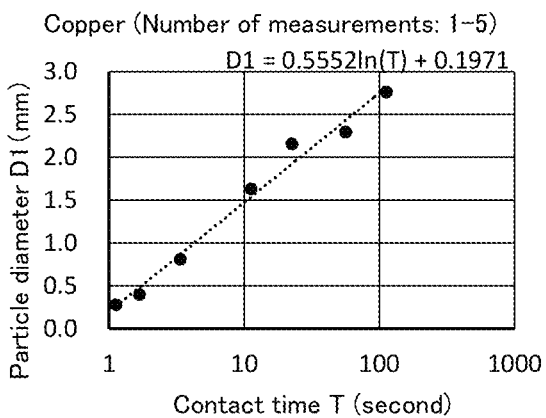
Figure 9C:
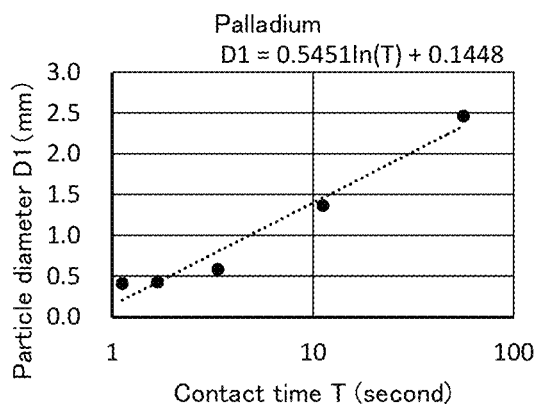
Figure 9D:
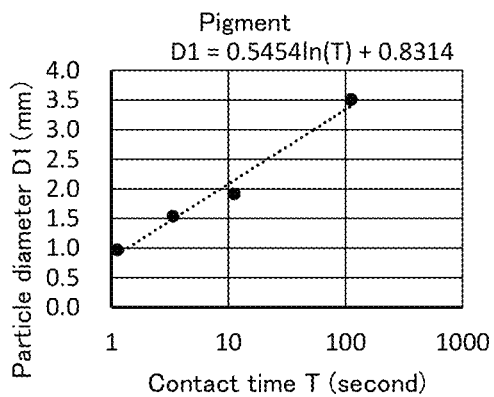
Figure 9E:
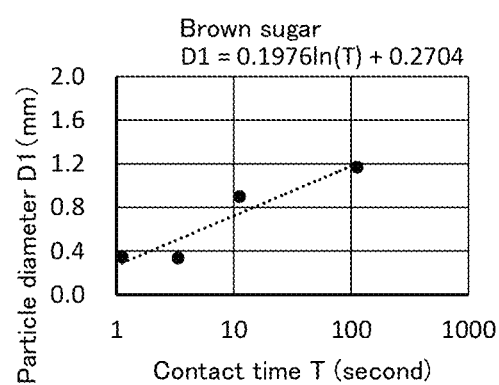

The upper limit D1 ($mm$) derived for each reaction object i in the manner described above, the corresponding contact time T (seconds), and the relational expression are shown in each of the graphs in FIGS. 9(A) to 9(E). In each of FIGS. 9(A) to 9(E), the ordinate represents the upper limit D1 (linear expression), and the abscissa represents the contact time T logarithmic expression). FIG. 9(A) shows results when the reaction object i is a copper ion and the number of measurements is 10. FIG. 9(B) shows results when the reaction object i is a copper ion and the number of measurements is 5. FIG. 9(C) shows results when the reaction object i is a palladium ion. FIG. 9(D) shows results when the reaction object i is a blue pigment. FIG. 9(E) shows results when the reaction object i is a brown sugar.

The relational expressions in Mathematical Formula 1 above which are calculated in FIGS. 9(A) to 9(E) are collectively shown in Mathematical Formulae 2 to 6 below.

copper ion (1 to 10 measurements)

$D1=0.411 \times LN(T)+0.137$ (Mathematical Formula 2)

copper ion (1 to 5 measurements)

$D1=0.555 \times LN(T)+0.197$ (Mathematical Formula 3)

palladium ion $D1=0.545 \times LN(T)+0.145$ (Mathematical Formula 4)

blue pigment $D1=0.545 \times LN(T)+0.831$ (Mathematical Formula 5)

brown sugar $D1=0.198 \times LN(T)+0.270$ (Mathematical Formula 6)

Comparison between FIGS. 9(A) and 9(B) shows that even for the same ion (copper ion), the coefficients Ai and the constants Bi of the relational expressions in Mathematical Formulae 2 and 3 above, i.e., the gradients and the intercepts (D1 axis) of the relational expressions in Mathematical Formula 1 above which are linearly expressed on the semi-logarithmic graph, are different between different numbers of measurements. The difference in gradient and intercept may result from the influence of the breakthrough. On the other hand, comparison between FIGS. 9(B) and 9(C) shows that the gradients and the intercepts of the relational expressions in Mathematical Formulae 3 and 4 above are very similar between different metal ions although they are ions of the same metals. That is, it is apparent that when the influence of the breakthrough is small, a relation between the upper limit D1 and the contact time T can be expressed by the same relational expression even in different metal ions. Therefore, in this embodiment, the result with a measurement number of 5 in which the influence of breakthrough is small is adopted in the case of a copper ion.

Comparison of FIGS. 9(B) and 9(C) with FIG. 9(D) shows that the reaction objects i are different, i.e., metal ions and a blue pigment, and the kinds of reactions are different, i.e., a complexation reaction and adsorption by chemical interaction, but the gradients of the relational expressions in Mathematical Formulae 3 to 5 above are very similar. That is, it is apparent that the metal ion and the blue pigment show the same change in upper limit D1 which is associated with a change in contact time T. However, it is apparent that in the blue pigment, the intercept is larger by about 0.6 mm, and therefore the upper limit D1 of the particle diameter range can be set larger by about 0.6 mm regardless of the contact time T.

Figure 10:
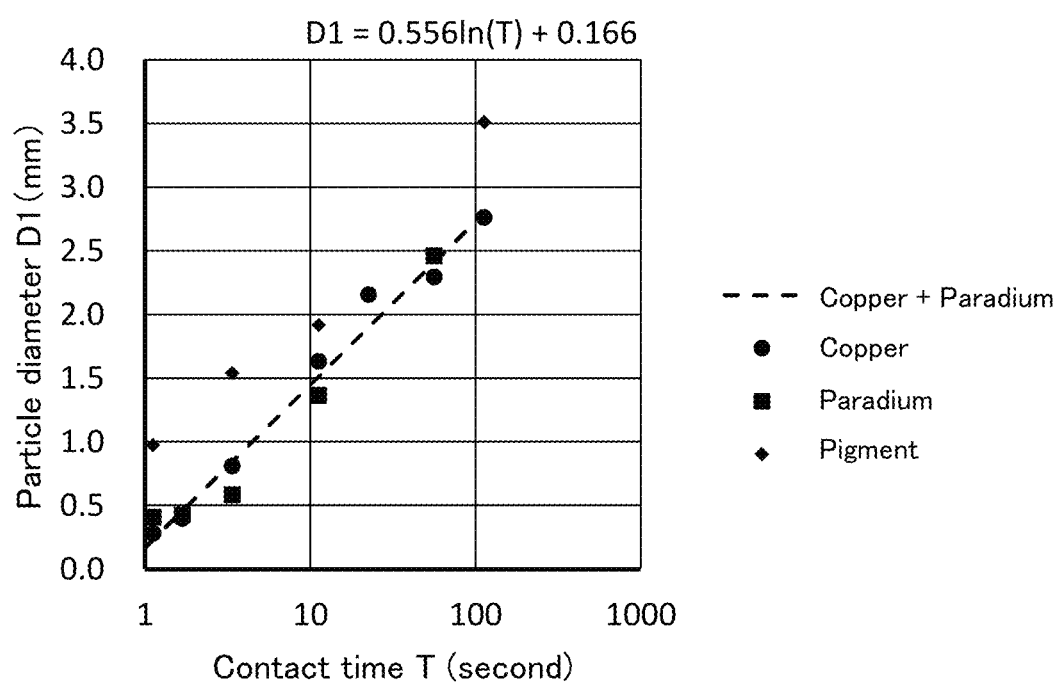
FIG. 10 is a view collectively showing the upper limits D1, the corresponding contact times T and the relational expressions shown in FIGS. 9(B) to 9(D) in a semi-logarithmic graph.

FIG. 10 collectively shows the results in FIGS. 9(B) to 9(D). The broken line (straight line) in FIG. 10 represents an overall relational expression in Mathematical Formula 1 above for the metal ions in which the result in five measurements for the copper ion and the result for the palladium ion in FIGS. 9(B) and 9(C) are calculated in combination. The relational expression is shown in Mathematical Formula 7 below. FIG. 10 shows that upper limits D1 at total 12 points for the copper ion and the palladium ion are accurately approximated by the relational expression shown in Mathematical Formula 7 below. In addition, it is apparent that upper limits D1 at four points for the blue pigment are all located above the relational expression, and the relational expression can be used for setting the upper limit D1 for a low-molecular-weight compound, as the reaction object i, having a molecular weight of about 100 to 2000, such as a blue pigment. For setting the upper limit D1 for the low-molecular-weight compound, the relational expression shown in Mathematical Formula 5 may be used in place of the relational expression shown in Mathematical Formula 7.

metal ion (copper ion+palladium ion)

$D1=0.556 \times LN(T)+0.166$ (Mathematical Formula 7)

Comparison between FIGS. 9(B) to 9(D) with FIG. 9(E) shows that when the reaction object i is a brown sugar, the gradient of the relational expression in Mathematical Formula 1 above is considerably different from the gradients for other reaction objects i such as metal ions, and the upper limit D1 for the brown sugar is clearly smaller than the upper limits D1 for other reaction objects i at the same contact time. Accordingly, it is apparent that when the reaction object i is a macromolecular compound having a large molecular size, such as brown sugar, it is difficult to commonly use the relational expression for metal ions as shown in Mathematical Formula 7 above. Therefore, for a compound having a molecular weight of about 2000 to 1000000, such as brown sugar, it is preferable to use the individual relational expression shown in Mathematical Formula 6.

In this embodiment, the initial concentration of each solution of the reaction object i is set to one kind of concentration, and this is because for the reason described below, it is considered that when the load capacity is 50% or less, the leakage ratio is constant irrespective of the initial concentration as long as there is no difference in particle diameter range and contact time (space velocity SV). This has also been confirmed in preliminary experiments for this embodiment.

For example, when the reaction object i is a metal ion (Examples 1 to 12), the fixed amount of the ligand (functional group) is almost equal to the retention volume of the metal ion. Here, the metal ion retention amount refers to a reaction site on the surface of the particle of the granular porous body. The fixed amount of the ligand is 0.8 mmol/g in the case that a mercapto group is fixed. Since the bulk density is 0.3 g/mL and the column volume is 0.56 mL, the metal ion retention volume is 0.136 mmol. In the case of a copper ion, 3 mL of a copper acetate (molecular weight 181) aqueous solution with an initial concentration of 4 mg/mL is caused to pass through the column in 1 to 10 measurements, and the loading amount of the metal ion is 0.066 mmol, i.e., 50% of the metal ion retention volume. In addition, when the loading amount of the metal ion exceeds 50% of the metal ion retention volume, the leakage (breakthrough) of the metal ion noticeably increases, and therefore the above-described relational expression is not met.

When the concentration ratio is measured while the initial concentration is decreased by, for example, diluting the solution to ½, ¼ . . . of the original initial concentration, copper molecules do not fill the reaction site or effective specific surface area of the particle surface, and thus the point at which the breakthrough starts to occur is delayed, or as compared with the case of the original initial concentration, the breakthrough is less noticeable, so that a flat curve like the measurement result of the concentration ratio for palladium is obtained.

Conversely, when the concentration ratio is measured while the initial concentration is increased by, for example, concentrating the solution to 2 times, 4 times . . . of the original initial concentration, the time during which copper molecules fill the reaction site or effective specific surface area of the particle surface is shortened, and thus the point at which the breakthrough starts to occur is advanced.

That is, when the column is continuously loaded with metal ions in such a manner that the metal ion retention amount is 50% or less, the same concentration conforming to the relational expression with the contact time T is obtained even if the concentration ratio is evaluated 50 times, or even 100 times rather than 10 times in the case of diluting the solution, or the concentration ratio is evaluated 5 times rather than 10 times in the case of concentrating the solution.

In other reactions, for example adsorption by chemical interactions, it is impossible to infinitely adsorb reaction object molecules exceeding the effective specific surface area of the granular porous body particles, and it is considered that the reaction object molecules in the liquid should not exceed the effective specific surface area or the maximum value for the reaction site, and the load capacity should be 50% or less.

The relational expression between the upper limit D1 of the particle diameter range of the granular porous body and the contact time T in the non-circulation-type column flow method has been described above.

Figure 11:
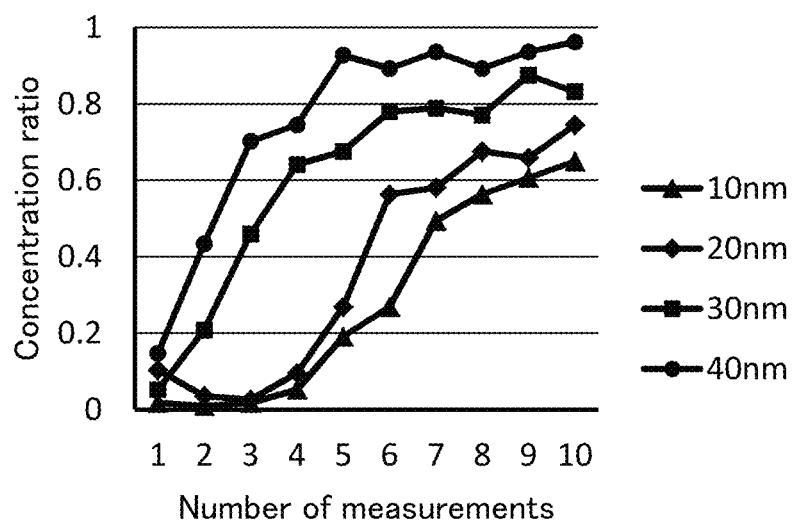
FIG. 11 is a view showing a change in concentration ratio of a post-reaction concentration and an initial concentration in Example 21 for different pore diameters where the reaction object is a copper ion.

The through-hole diameter and the pore-diameter of the granular porous body to be used in this reaction method will now be described on the basis of experimental data. FIG. 11 shows results of evaluating the concentration ratio where the reaction object is a copper ion in the same manner as in Example 1 using this column with four kinds of granular porous bodies having a particle diameter range of 0.25 to 0.5 mm, a through-hole diameter of 1 μm and pore diameters of 10 nm, 20 nm, 30 nm and 40 nm, respectively (Example 21). The space velocity SV (solution flow rate) and the initial solution concentration are the same as in Example 1. An average of the concentration ratios in 1 to 5 measurements (leakage ratio) is calculated, and the result shows that the average is 6%, 11%, 41%, 59% in ascending order of the pore diameters. When the pore diameter exceeds 20 nm, the leakage ratio rapidly increases, and therefore in the case where the reaction object substance is a metal ion, the appropriate pore diameter is about 2 to 20 nm as described above. When the pore diameter is 30 nm, the leakage ratio is 50% or less, but when the space velocity SV is 32, the upper limit D1 of the particle diameter range is about 2.7 mm, and therefore the pore diameter is preferably 20 nm or less, more preferably 15 nm or less, still more preferably 10 nm or less in anticipation of an increase in particle diameter range.

Figure 12A:
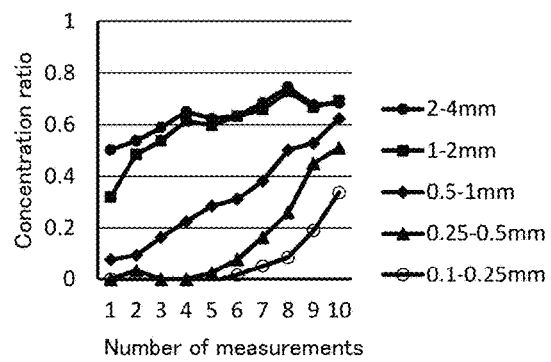
FIGS. 12(A) to 12(C) are views showing a change in concentration ratio of a post-reaction concentration and an initial concentration in Examples 22 to 24 for different through-hole diameters or pore diameters where the reaction object is a copper ion.
Figure 12C:
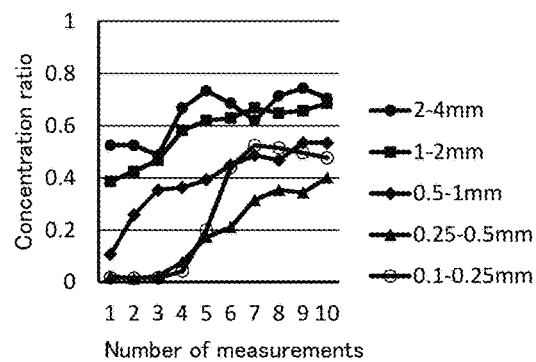
Figure 12B:
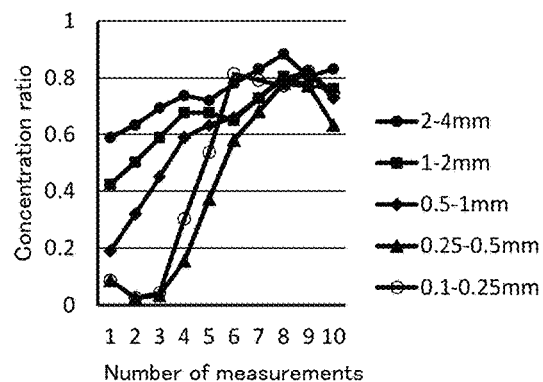

FIGS. 12(A) to 12(C) show results of evaluating the concentration ratio where the reaction object is a copper ion in the same manner as in Example 1 using the main column with three kinds of granular porous bodies (Examples 22 to 24) in which at least one of the through-hole diameter and the pore diameter of the granular porous body is changed from Example 1. In Example 22 shown in FIG. 12(A), the through hole diameter and the pore diameter are 0.1 μm and 2 nm, respectively, and the space velocity SV is 32. In Example 23 shown in FIG. 12(B), the through hole diameter and the pore diameter are 1 μm and 15 nm, respectively, and the space velocity SV is 32. In Example 24 shown in FIG. 12(C), the through hole diameter and the pore diameter are 50 μm and 10 nm, respectively, and the space velocity SV is 32. For the particle diameter range in each of Examples 22 to 24, when an average of the concentration ratios in 1 to 5 measurements (leakage ratio) is calculated and the upper limit of the particle diameter range at which the leakage ratio is 50% is determined in the same manner as in calculation of the coefficient Ai and the constant Bi, the result shows that the averages are 2.28 mm, 1.61 mm and 2.35 mm, respectively, and each not more than the upper limit D1 (=2.79) given by Mathematical Formula 7 from a contact time of 112.5 seconds at a space velocity SV of 32, and thus this reaction method is applicable at a through-hole diameter of 0.1 to 50 μm.

[Circulation-Type Column Flow Method and Shaking Method]

Next, the upper limit D1 (*mm*) of the particle diameter range in the case where the contact method is a circulation-type column flow method or a shaking method is given by the following relational expression formed of a linear expression with the contact time T (seconds) as a variant as shown in Mathematical Formula 8 below. Ci is a coefficient of the first-order term in the reaction object i, and Di is a constant term in the reaction object i. In the case of the circulation-type column flow method, the contact time T (seconds) is given by a value obtained by multiplying a fluid flow time (seconds) of a liquid by a volume ratio R obtained by dividing a volume (column volume) of the granular porous body by the volume of the liquid, and in the case of the shaking method, the contact time T (seconds) is given by a value obtained by multiplying the volume ratio R by the elapsed time after addition of the granular porous body in the liquid.

$$D1 = Ci \times T + Di \quad \text{(Mathematical Formula 8)}$$

Before the coefficient Ci and the constant Di in Mathematical Formula 8 above are derived, first the relation between the "leakage ratio" in the shaking method and the particle diameter range, through-hole diameter and pore diameter of the granular porous body will be examined.

The shaking method is used as a method for collecting a noble metal from a solution containing the noble metal. In the shaking method used for collecting a noble metal, a granular porous body as an adsorbent is added in a solution containing a metal to be collected, and the mixture is stirred or shaken to adsorb and remove the noble metal to be collected. In this embodiment, stirring is also considered as one mode of shaking.

As a solution containing palladium ions, 4 mL of a dinitrodiaminepalladium (II) aqueous solution having an initial concentration of 165 μg/mL as with Examples 8 to 12 was provided. Granular porous bodies (each in an amount of 10 mg) with 60 kinds of combinations of the particle diameter range, the through-hole diameter and the pore diameter as shown in FIG. 13 and commercially available single-pore particle silica gels (each in an amount of 10 mg) as comparative examples with four kinds of combinations of the particle diameter range and the pore diameter as shown in FIG. 13 were each added in a container containing the aqueous solution, the mixture was stirred at a rotation speed of 33 rpm, and after elapse of 2 hours and after elapse of 24 hours after the addition, a post-reaction palladium ion concentration (post-reaction concentration) of the aqueous solution was measured by an ultraviolet visible light absorptiometer. The 60 kinds of the particulate porous bodies and the four kinds of silica gels as comparative examples all contain mercaptopropyl that is the same functional group as in Example 1 above.

In the 60 kinds of granular porous bodies, six kinds of particle diameter ranges: 0.106 to 0.25 mm, 0.25 to 0.5 mm, 0.5 to 1 mm, 1 to 2 mm, 2 to 4 mm and 4 to 8 mm were set, five kinds of through-hole diameters: 0.1 μm, 0.5 μm, 1 μm, 10 μm and 50 μm were set, and six kinds of pore diameters: 2 nm, 10 nm, 15 nm, 20 nm, 30 nm and 40 nm were set. In the four kinds of silica gels as comparative examples, six kinds of particle diameter ranges: 0.106 to 0.25 mm, 0.25 to 0.5 mm, 0.5 to 1 mm and 1 to 2 mm were set, and only one kind of pore diameter: 2 nm was set. The combinations of the particle diameter range, the through-hole diameter and the pore diameter are as shown in FIG. 13, and the description thereof will be omitted.

In FIG. 13, six kinds of particle diameter ranges are arranged in the lateral direction, and ten kinds of combinations of the through-hole diameter and the pore diameter of the granular porous bodies and one kind of pore diameter of the silica gel in comparative examples are arranged in the longitudinal direction to form a 6×11 array, and in each cell of the array, a concentration ratio obtained by dividing the measured post-reaction concentration by the initial concentration is shown. Cells with a concentration ratio exceeding 50%, i.e., cells with a leakage ratio of 50% or more is shaded for the sake of convenience.

In the shaking method, it may be necessary to reduce the leakage ratio to 50% or less for efficiently maintaining the reaction as with the non-circulation-type column flow method described above, and thus the leakage ratio is set to 50% or less as a practical range.

FIG. 13 shows that the larger the particle diameter range of the granular porous body, the higher the concentration ratio and the larger the leakage ratio. The shorter the elapsed time, the higher the concentration ratio and the larger the leakage ratio even when the combinations of the particle diameter range, through-hole diameter and pore diameter are the same. This tendency is the same as in the case of the non-circulation-type column flow method described above.

FIG. 13 shows that in a combination of the particle diameter range and the pore diameter where the leakage ratio is 50% or less, a change in leakage ratio due to a change in through-hole diameter is less noticeable as compared with the particle diameter range and the pore diameter. This tendency is the same as in the case where the contact method is a non-circulation-type column flow method.

From FIG. 13, there is a tendency that in the same particle diameter range at the same elapsed time, the leakage ratio increases as the pore diameter increases. This is because when the pore diameter increases, the specific surface area of the granular porous body decreases, leading to deterioration of performance. When the pore diameter is 20 nm, the leakage ratio is 50% or less in a particle diameter range of 1 mm or less at an elapsed time of 24 hours, and when the pore diameter is 15 nm, the leakage ratio is 50% or less in a particle diameter range of 4 mm or less at an elapsed time of 24 hours, but when the particle diameter range increases, or the elapsed time is shortened, the leakage ratio exceeds 50%. Therefore, depending on conditions, the upper limit of the pore diameter may be 20 nm, but is more preferably 15 nm, still more preferably 10 nm. This tendency is also the same as in the case where the contact method is a non-circulation-type column flow method.

FIG. 13 shows that the leakage ratios in all the four kinds of silica gels as comparative examples are 87% or more, and these silica gels are not suitable for practical use in any of the particle diameter ranges.

Examples B and C will now be briefly described in which aminoethylaminopropyl that is a functional group different from the functional group introduced to the surface of granular porous body used in the example with 60 kinds of combinations as shown in FIG. 13 (hereinafter, referred to as "Example A" for the sake of convenience) is introduced to the surface of the granular porous body. In Example B, the metal ion as a reaction object was a palladium ion that is the same ion as in Example A, and in Example C, the metal ion as a reaction object was a ruthenium ion that is different from the metal ion in Example A. In Example B, 4 mL of a dinitrodiaminepalladium (II) aqueous solution having an initial concentration of 165 μg/mL as in Example A was provided. In Example C, 4 mL of a ruthenium trichloride aqueous solution having an initial concentration of 250 μg/mL was provided as a solution containing a ruthenium ion. The granular porous bodies used in Examples B and C had a through-hole diameter of 1 μm and a pore diameter of 2 nm. In Examples B and C, a leakage ratio was measured in the same manner as in Example A.

FIG. 14 shows results of measuring the leakage ratio in the particle diameter ranges in Example B. FIG. 15 shows results of measuring the leakage ratio in the particle diameter ranges in Example C.

Comparison between combinations of the same through-hole diameter and pore diameter in FIGS. 14 and 13 at an elapsed time of 2 hour and at an elapsed time of 24 hours shows that both the combinations have a leakage ratio of 50% or less in a particle diameter range of 2 mm or less at an elapsed time of 2 hours, both the combinations have a leakage ratio of 50% or less in all the particle diameter ranges at an elapsed time of 24 hours, and as a whole, there is no significant difference in performance due to a difference in functional group although there is a difference between individual values for each particle diameter range.

Comparison between combinations in FIGS. 14 and 15 at an elapsed time of 2 hour and at an elapsed time of 24 hours shows that both the combinations have a leakage ratio of 50% or less in a particle diameter range of 2 mm or less at an elapsed time of 2 hours, both the combinations have a leakage ratio of 50% or less in all the particle diameter ranges at an elapsed time of 24 hours, and as a whole, there is no significant difference in performance due to a difference in metal ion although there is a difference between individual values for each particle diameter range.

A procedure for deriving the coefficient Ci and the constant Di of Mathematical Formula 8 above in the shaking method using a palladium ion as the reaction object i will now be described.

In the derivation procedure, granular porous bodies with six kinds of particle diameter ranges as in Example A as the particle diameter range, and with three kinds of combinations (through-hole diameter/pore diameter: 0.1 μm/2 nm, 0.5 μm/2 nm and 1 μm/2 nm) among six kinds of combinations in Example A were provided aside from Example A with 60 kinds of combinations as shown in FIG. 13. Mercaptopropyl, which is a functional group that is the same as in Example A, is introduced to the surface of the granular porous body.

In addition, as solutions containing a palladium ion, total 24 kinds of samples: 18 kinds of dinitrodiaminepalladium (II) aqueous solutions (each in an amount of 4 mL) having an initial concentration of 165 μg/mL as in Example A, and six kinds of the aqueous solutions (each in an amount of 1 mL) were provided. Total 18 kinds of granular porous bodies with the three kinds of through-hole diameters and six kinds of particle diameter ranges were added in an amount of 0.03 mL to 18 kinds of the aqueous solutions (each in an amount of 4 mL), respectively, and granular porous bodies with a through-hole diameter of 1 μm and with six kinds of particle diameter ranges were added in an amount of 0.01 mL to 6 kinds of the aqueous solutions (each in an amount of 1 mL), respectively. The resulting mixtures were each stirred at a rotation speed of 33 rpm.

At five measurement points: 10 minutes, 30 minutes, 60 minutes, 120 minutes and 1440 minutes after addition of the granular porous bodies to total 18 kinds of samples being the solutions (each in an amount of 4 mL), a post-reaction palladium ion concentration (post-reaction concentration) of the aqueous solution was measured by an ultraviolet visible light absorptiometer, and a leakage ratio was calculated from a concentration ratio of the post-reaction concentration and the initial concentration (post-reaction concentration/initial concentration). Further, at four measurement points: 2 minutes, 7 minutes, 12 minutes and 20 minutes after addition of the granular porous bodies to total six kinds of samples being the solutions (each in an amount of 1 mL), a post-reaction palladium ion concentration (post-reaction concentration) of the aqueous solution was measured by an ultraviolet visible light absorptiometer, and a leakage ratio was calculated from a concentration ratio of the post-reaction concentration and the initial concentration (post-reaction concentration/initial concentration).

Next, for combinations of the same aqueous solution volume and through-hole diameter, a particle diameter at which the leakage ratio at each of the five measurement points is 50% is calculated from the leakage ratio for each of the six kinds of particle diameter ranges. Specifically, a median of the particle diameter range for the leakage ratio around a leakage ratio of 50% was linearly interpolated to determine a median particle diameter corresponding to a leakage ratio of 50%, and the median particle diameter was multiplied by a ratio (1.33 in this embodiment) of the upper limit and the median of the particle diameter range to calculate the upper limit D1 (mm) of the particle diameter.

In the shaking method, the number of kinds of ratios of the volume of the solution and the volume of the granular porous body to be added is not 1, and therefore it is not possible to simply compare cases where there is a difference in the ratio. For this reason, in this embodiment, a value obtained by multiplying the elapsed time by a volume ratio obtained by dividing the volume of the granular porous body by the volume of the solution, and converting the resulting product in terms of seconds is defined as the contact time T (seconds) of the relational expression in Mathematical Formula 8 above. Through correction with the volume ratio, the elapsed time in the shaking method is converted into a value corresponding to the contact time T (a value obtained by converting the reciprocal of the space velocity SV in terms of seconds) in the non-circulation-type column flow method.

Figure 16:
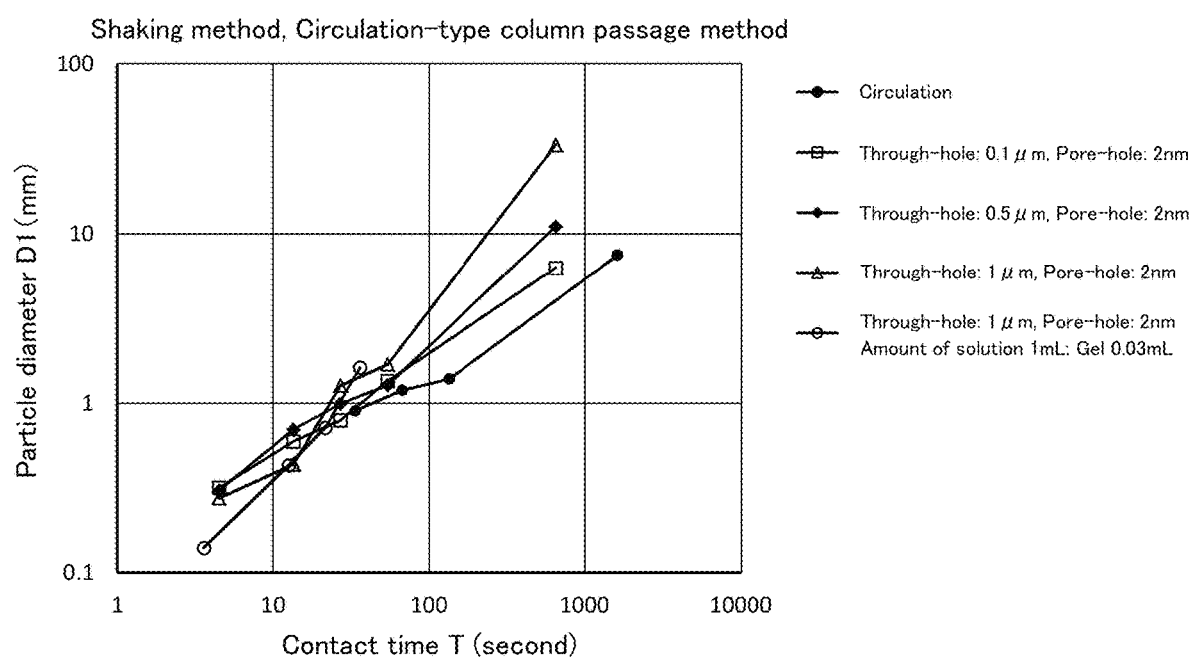
FIG. 16 is a view showing an upper limit D1 in a shaking method and a circulation-type column flow method, a corresponding contact time T, and a relational expression thereof in a double logarithmic graph.

FIG. 16 is a view obtained by plotting the upper limit D1 of the particle diameter calculated in the manner described above and the corresponding contact time T (seconds). In FIG. 16, the ordinate represents the upper limit D1 (logarithmic expression), and the abscissa represents the contact time T (logarithmic expression). In FIG. 16, the calculation points are connected for each of four kinds of combinations of the solution volume (4 mL and 1 mL) and the through hole diameter (0.1 μm, 0.5 μm and 1 μm) to show a polygonal line. Hereinafter, for the sake of convenience, four kinds of combinations of the solution volume and the through-hole diameter (4 mL/0.1 μm, 4 mL/0.5 μm, 4 mL/1 μm and 1 mL/1 μm) are referred to as Examples E1 to E4, respectively. In FIG. 16, results in the circulation-type column flow method are also shown, and these results will be described later.

In the case of Examples E1 to E3 in which the volume of the solution was 4 mL, there was a difference due to a difference in through-hole diameter at an elapsed time of 24 hours (a contact time T of 648 seconds as corrected by the volume ratio). However, this difference is not necessarily a difference caused by a difference in through-hole diameter, but may be a measurement error caused by a long elapsed time.

FIG. 16 shows that at a contact time T of several hundred seconds or less, the upper limit D1 is distributed on substantially the same straight line in each of Examples E1 to E4. In both Examples E3 and D4, the upper limit D1 is distributed on the same straight line, and therefore it is apparent that correction in which the elapsed time is multiplied by the volume ratio to determine the contact time T is appropriate. Thus, from the results shown in FIG. 16, it is apparent that in the shaking method, the upper limit D1 of the particle diameter range for attaining a leakage ratio of 50% or less is expressed by a linear function of the contact time T.

From the upper limit D1 and the corresponding contact time T in each of Examples E1 to E4, which are plotted in FIG. 16, the coefficient Ci and the constant Di of the linear function in Mathematical Formula 8 above can be approximately calculated by a least squares error method.

A procedure for deriving the coefficient Ci and the constant Di of Mathematical Formula 8 above in the case where the contact method is a circulation-type column flow method using a copper ion as the reaction object i will now be described.

In the derivation procedure, granular porous bodies with six kinds of particle diameter ranges as in Example A as the particle diameter range, and with a through-hole diameter of 1 µm and a pore diameter of 2 nm were provided. Mercaptopropyl, which is a functional group that is the same as in Examples A and E1 to E4, is introduced to the surface of the granular porous body. A column container having an inner diameter of 6 mm and a length of 20 mm was filled with the above-mentioned granular porous body to obtain a main column to be used in the circulation-type column flow method (referred to as Example F). The column volume is 0.56 mL as in the case of the non-circulation-type column flow method.

Figure 17:
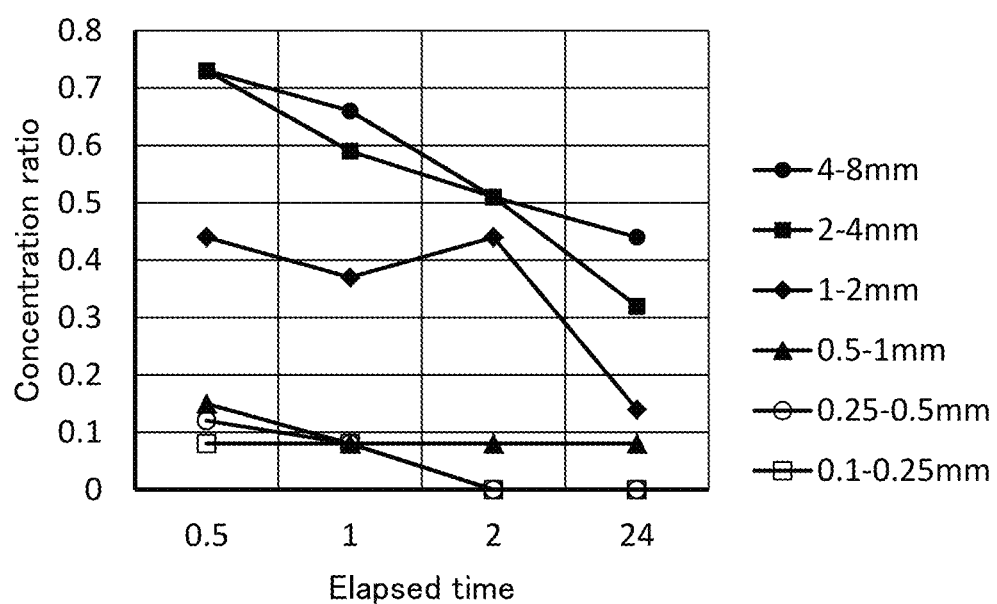
FIG. 17 is a view showing results of a concentration ratio of a post-reaction concentration and an initial concentration for each elapsed time in a circulation-type column flow method.

In addition, 30 mL of a copper acetate aqueous solution (concentration: 0.5 mg/mL) was provided as a solution containing a copper ion, and continuously circulated at a flow rate of 10 mL/minute in this column, i.e., the solution discharged from a column outlet was returned to a column inlet, and circulated. At four measurement points: 30 minutes, 60 minutes, 120 minutes and 1440 minutes after the start of circulation, a post-reaction copper ion concentration (post-reaction concentration) of the aqueous solution was measured by an ultraviolet visible light absorptiometer, and a leakage ratio was calculated from a concentration ratio of the post-reaction concentration and the initial concentration (post-reaction concentration/initial concentration). FIG. 17 shows results of measuring a concentration ratio at each measurement point.

Next, a particle diameter at which the leakage ratio at each of the four measurement points is 50% is calculated from the leakage ratio for each of the six kinds of particle diameter ranges. Specifically, a median of the particle diameter range for the leakage ratio around a leakage ratio of 50% was linearly interpolated to determine a median particle diameter corresponding to a leakage ratio of 50%, and the median particle diameter was multiplied by a ratio (1.33 in this embodiment) of the upper limit and the median of the particle diameter range to calculate the upper limit D1 (mm) of the particle diameter.

In the case of the circulation-type column flow method, the solution discharged from the column outlet is returned to the column inlet, and subjected to the reaction again unlike the case of the non-circulation-type column flow method, and therefore, evidently it is problematic that the contact time T (a value obtained by converting the reciprocal of the space speed SV in terms of seconds) adopted in the non-circulation-type column flow method is used as it is. In addition, in the case of the circulation-type column flow method, the whole solution and the whole of granular porous body are caused to come into contact with each other by maintaining circulation unlike the case of the non-circulation-type column flow method, and therefore the circulation-type column flow method has a behavior close to that in the shaking method. In addition, like the case of the shaking method, the number of kinds of ratios of the volume of the solution and the volume of the granular porous body to be added is not 1, it is impossible to simply compare cases where there is a difference in the ratio.

Accordingly, in this embodiment, like the case of the shaking method, a value obtained by multiplying the elapsed time after the start of the passage (fluid flow time of the solution) by a volume ratio obtained by dividing the volume of the granular porous body by the volume of the solution, and converting the resulting product in terms of seconds is defined as the contact time T (seconds) of the relational expression in Mathematical Formula 8 above.

In FIG. 16, the contact time T (seconds) corresponding to the upper limit D1 of the particle diameter calculated in the manner described above and results in the shaking method was plotted together with the results in the shaking method in Examples E1 to E4 for facilitating comparison with results in the shaking method.

FIG. 16 shows that the results in the shaking method in Examples E1 to E4 and the results in the circulation-type column flow method in Example F are distributed together at almost the same position on the graph of FIG. 16, and as in the case of Examples E1 to E4, the upper limit D1 is distributed on almost the same straight line. That is, from the results shown in FIG. 16, it is apparent that in the circulation-type column flow method, the upper limit D1 of the particle diameter range for attaining a leakage ratio of 50% or less is expressed by a linear function of the contact time T like the case of the shaking method.

From the upper limit D1 and the corresponding contact time T in each of Examples E1 to E4 and F, which are plotted in FIG. 16, the coefficient Ci and the constant Di of the linear function in Mathematical Formula 8 above can be approximately calculated by a least squares error method. However, in this embodiment, the calculated coefficients Ci and constants Di in Examples E1 to E4 and F are averaged, and the obtained averages were set to the coefficient Ci and the constant Di, respectively, of the linear function shown in Mathematical Formula 8 above. The linear function derived in this manner is shown in Mathematical Formula 9 below.

$$D1 = 0.0315 \times T + 0.470 \qquad \text{(Mathematical Formula 9)}$$

For the shaking method and the circulation-type column flow method, a case where the reaction object i is a metal ion has been exclusively described, but in the non-circulation-type column flow method, there is a common tendency between the metal ion and the low-molecular-weight compound having a molecular weight of 2000 or less in the relationship between the upper limit D1 of the particle diameter range and the contact time, and therefore in the case of the shaking method and the circulation-type column flow method, there may be a similar common tendency.

OTHER EMBODIMENTS

Hereinafter, other embodiments of this reaction method and granular porous body will be described.

<1> In the embodiment described above, the inorganic compound that forms the skeleton body 2 of the granular porous body 1 is assumed to be silica (silica gel or silica glass), but the inorganic compound is not limited to silica, and oxide porous bodies containing a typical metal element such as aluminum, phosphorus, germanium or tin, or a transition metal element such as titanium, zirconium, vanadium, chromium, iron, cobalt, nickel, palladium, platinum, copper, silver, gold or zinc can also be used. In addition, inorganic oxide porous bodies including a composite containing an alkali metal element such as lithium or sodium, an alkaline earth metal element such as magnesium or calcium, or a lanthanum-based element such as lanthanum and cerium can also be used.

An example of a method for synthesizing a titania monolithic porous body before granulation where the skeleton body 2 of the granular porous body 1 is titania ($TiO_2$) will be briefly described.

To a mixed solution of 2.5 mL of 1-propanol containing 0.4 g of polyethylene glycol (average molecular weight:

10000) and 2.5 mL of ethyl acetoacetate is added 5.0 mL of tetra-n-propyl titanate, 1.0 mL of a 1 mol/L ammonium nitrate aqueous solution is then added with stirring to obtain a homogeneous solution, and the solution is transferred into a sealed container, and left standing at 40° C. for 1 day to gel the solution. The resulting gel is immersed in a mixed solvent of water and ethanol for 1 day to be washed, and is then naturally dried, and sintered at 500° C. for 5 hours to obtain a titania monolithic porous body.

When the inorganic compound that forms the skeleton body 2 is titania, titania is superior in acid resistance and alkali resistance to silica, and while silica is dissolved in an aqueous solution having a pH of 2 or less or a pH of 11 or more, titania can be used without being dissolved in such an aqueous solution.

<2> In the embodiment described above, examples are described while specific values (quantity, temperature, time and so on) are clearly shown regarding the method for synthesizing a monolithic porous body, but the numerical conditions in the synthesis method are not limited to those shown in the examples.

<3> In the embodiment described above, since the granular porous body 1 has a two-step hierarchical porous structure including through-holes 3 and pores 4, the monolithic porous body in the process of preparing the granular porous body 1 is assumed to have a similar two-step hierarchical porous structure. However, the monolithic porous body before granulation may have a three-step hierarchical porous structure having holes with a pore diameter larger than that of the through-hole 3, in addition to through-holes 3 and pores 4. Here, at the time when the monolithic porous body is ground and granulated to prepare the granular porous body 1, the skeleton body 2 is ground along the holes, and therefore in the process of forming the holes, the diameter of the skeleton body 2 surrounded by the pores are made uniform to some degree, so that the particle diameter Dp of the ground granular porous body 1 can be efficiently made to fall within a certain range.

<4> In the embodiment described above, as the reaction object i specifically used in measurement of a leakage ratio, a copper ion, a palladium ion and a ruthenium ion are employed in the case of the metal ion, Basic Blue 17 is employed in the case of the blue pigment, and a Hateruma-produced brown sugar is employed in the case of the brown sugar, but the metal ion, the low-molecular-weight compound having a molecular weight of 2000 or less, and the compound having a molecular weight of 2000 or more and 1000000 or less as the reaction object i are not limited thereto.

INDUSTRIAL APPLICABILITY

This reaction method, granular porous body and column according to the present invention can be used in various reaction methods for reacting a reaction object such as a metal ion with a liquid containing the reaction object being in contact with the granular porous body, such as adsorption, ion exchange, complexation and catalytic reaction, and methods for bringing a filter, an adsorbent, a reaction material, a solid phase catalyst or the like into contact with a liquid, particularly methods for adsorbing a metal in a solution and collecting materials.

DESCRIPTION OF SYMBOLS

1 Granular porous body
2 Skeleton body
3 Through-hole
4 Pore

The invention claimed is:

1. A granular porous body used for reaction with a metal ion, wherein
the granular porous body includes a skeleton body including an inorganic compound having a three-dimensional continuous network structure, and has a two-step hierarchical porous structure including through-holes formed in voids in the skeleton body, and pores extending from a surface to an inside of the skeleton body and dispersively formed on the surface,
a most frequent pore diameter in a pore diameter distribution of the pores is within a range of 2 nm or more and 20 nm or less,
a most frequent pore diameter in a pore diameter distribution of the through-holes is equal to or more than 5 times of the most frequent pore diameter of the pores, and within a range of 0.1 μm or more and 50 μm or less,
a particle diameter of the granular porous body is equal to or more than 2 times of the most frequent pore diameter of the through-holes, and within a range of 20 μm or more and 4 mm or less,
a functional group having affinity with the metal ion is chemically modified on a surface of the granular porous body, and
the functional group has a function of adsorbing the metal ion to the surface of the granular porous body by undergoing a complexation reaction with the metal ion.

2. The granular porous body according to claim 1, wherein the functional group has a function of adsorbing the metal ion to the surface of the granular porous body by undergoing a complexation reaction with the metal ion.

3. The granular porous body according to claim 1, wherein
the granular porous body is obtained by grinding and granulating a massive porous body prepared by a sol-gel method,
the massive porous body includes a skeleton body including the inorganic compound having a three-dimensional continuous network structure, and has a two-step hierarchical porous structure including through-holes formed in voids in the skeleton body, and pores extending from a surface to an inside of the skeleton body and dispersively formed on the surface,
a most frequent pore diameter in a pore diameter distribution of the pores of the massive porous body is within a range identical to the range of the most frequent pore diameter in the pore diameter distribution of the pores of the granular porous body, and
a most frequent pore diameter in a pore diameter distribution of the through-holes of the massive porous body is within a range identical to the range of the most frequent pore diameter in the pore diameter distribution of the through-holes of the granular porous body.

4. The granular porous body according to claim 1, wherein the inorganic compound is silica or titania.

5. A column used for reaction with a metal ion, wherein a column container is filled with the granular porous body according to claim 1.

6. The column according to claim 5, wherein
a particle diameter of the granular porous body is not more than an upper limit D (mm) determined depending on a contact time T (seconds) between a liquid containing the metal ion and the granular porous body, the upper limit D is given by:

$$D=0.556\times LN(T)+0.166$$

where the function LN is a natural logarithm, and
the contact time T is given by a value obtained by dividing a volume (m³) of the granular porous body by a flow rate (m³/second) of the liquid, in a case where passage of the liquid is non-circulation-type passage, and
the upper limit D is given by:

$$D=0.0315\times T+0.470,$$

the contact time T is given by a value obtained by multiplying a fluid flow time (seconds) of the liquid by a volume ratio obtained by dividing the volume of the granular porous body by a volume of the liquid, in a case where passage of the liquid is circulation-type passage.

7. The granular porous body according to claim 1, wherein
the functional group includes any one of a thiol group, a carboxylic acid group, an amine-based functional group, and a phosphate group, a sulfate group, an ammonium group, and a composite of these substituents.

8. The granular porous body according to claim 1, wherein
the functional group is chemically modified on a surface of the granular porous body via a covalent bond.

* * * * *